(12) United States Patent
Schuman

(10) Patent No.: US 10,372,882 B2
(45) Date of Patent: Aug. 6, 2019

(54) MEDIA DISTRIBUTION NETWORK, ASSOCIATED PROGRAM PRODUCTS, AND METHODS OF USING THE SAME

(71) Applicant: Joseph Schuman, New York, NY (US)

(72) Inventor: Joseph Schuman, New York, NY (US)

( * ) Notice: Subject to any disclaimer, the term of this patent is extended or adjusted under 35 U.S.C. 154(b) by 0 days.

(21) Appl. No.: 15/037,463

(22) PCT Filed: Nov. 18, 2014

(86) PCT No.: PCT/US2014/066185
§ 371 (c)(1),
(2) Date: May 18, 2016

(87) PCT Pub. No.: WO2015/074056
PCT Pub. Date: May 21, 2015

(65) Prior Publication Data
US 2016/0306950 A1    Oct. 20, 2016

Related U.S. Application Data

(60) Provisional application No. 61/905,495, filed on Nov. 18, 2013, provisional application No. 61/917,691, filed on Dec. 18, 2013.

(51) Int. Cl.
*H04N 7/173* (2011.01)
*G06F 21/10* (2013.01)
(Continued)

(52) U.S. Cl.
CPC .......... *G06F 21/10* (2013.01); *G06F 16/9535* (2019.01); *H04N 21/237* (2013.01);
(Continued)

(58) Field of Classification Search
None
See application file for complete search history.

(56) References Cited

U.S. PATENT DOCUMENTS

2009/0076936 A1* 3/2009 Wright .................. G06Q 30/00
705/34
2011/0107367 A1* 5/2011 Georgis ............ H04N 21/2347
725/32

(Continued)

FOREIGN PATENT DOCUMENTS

WO     2001/080039 A2    10/2001
WO     WO 0180039 A2 *   10/2001 ............. G06Q 30/02

OTHER PUBLICATIONS

Jan Ozer, "Ustream, Justin.tv, Livestream, and Bambuser: Streaming Unplugged—Streaming Media Magazine", Streaming Media Magazine, Feb. 21, 2012, XP55288292, Retrieved from the Internet: URL: http://www.streamingmedia.com/Articles/Editorial/Featured-Articles/Ustream-Justin.tv-Livestream-and-Bambuser-Streaming-Unplugged-83016.aspx [retrieved on Oct. 11, 2017].

(Continued)

*Primary Examiner* — William J Kim
(74) *Attorney, Agent, or Firm* — Amster, Rothstein & Ebenstein LLP

(57) ABSTRACT

A media server is disclosed, and comprises one or more non-transitory computer-readable memory devices upon which at least one set of instructions are stored, one or more processors, a request module, an authentication module, a filtering module, a publishing module, and a commercialization module. The request module is electronically coupled with the one or more non-transitory computer-readable memory devices for requesting data associated with media content from one or more remote electronic devices electronically coupled with the media server.

15 Claims, 19 Drawing Sheets

(51) Int. Cl.
*G06F 16/9535* (2019.01)
*H04N 21/237* (2011.01)
*H04N 21/2665* (2011.01)
*H04N 21/41* (2011.01)
*H04N 21/422* (2011.01)
*H04N 21/4223* (2011.01)
*H04N 21/4788* (2011.01)
*H04N 21/2343* (2011.01)
*H04N 21/2347* (2011.01)
*H04N 21/235* (2011.01)
*H04N 21/254* (2011.01)
*H04N 21/414* (2011.01)
*H04N 21/4784* (2011.01)
*H04N 21/2747* (2011.01)
*G06F 16/40* (2019.01)

(52) U.S. Cl.
CPC ..... *H04N 21/2347* (2013.01); *H04N 21/2353* (2013.01); *H04N 21/234363* (2013.01); *H04N 21/254* (2013.01); *H04N 21/2541* (2013.01); *H04N 21/2665* (2013.01); *H04N 21/2747* (2013.01); *H04N 21/4126* (2013.01); *H04N 21/41407* (2013.01); *H04N 21/422* (2013.01); *H04N 21/4223* (2013.01); *H04N 21/42203* (2013.01); *H04N 21/4784* (2013.01); *H04N 21/4788* (2013.01); *G06F 16/40* (2019.01); *G06F 2221/0708* (2013.01); *G06F 2221/2149* (2013.01)

(56) References Cited

U.S. PATENT DOCUMENTS

2012/0102154 A1    4/2012  Huang et al.
2012/0192239 A1*  7/2012  Harwell ............ H04N 21/2343
                                                            725/109
2012/0198335 A1    8/2012  Huang

OTHER PUBLICATIONS

European Patent Office, Extended European Search Report, issued in EP Patent Application No. EP14 862 563.5, which is a European counterpart of U.S. Appl. No. 15/037,463 dated Jul. 10, 2017, 7 pages.

\* cited by examiner

MEDIA DISTRIBUTION NETWORK, ASSOCIATED PROGRAM PRODUCTS, AND METHODS OF USING THE SAME

CROSS-REFERENCE TO RELATED APPLICATION

This application claims priority to and the benefit of each of U.S. Provisional Patent Application No. 61/905,495, filed on Nov. 18, 2013, and U.S. Provisional Patent Application No. 61/917,691, filed on Dec. 18, 2013, the entire contents of each of which are incorporated by reference herein.

FIELD OF INVENTION

The present invention generally relates to a media distribution network, associated program products, and methods of using the same.

SUMMARY

With increasing availability of data bandwidth and video camera-equipped devices (e.g., smartphones, Google Glass, etc.), live media broadcasting is becoming a fast-growing medium. This emerging wealth of "user-broadcasters" can provide a new, advantageous source of news coverage. For example, mobile device-equipped bystanders near breaking news, such as public events (for example, protests, riots, military strikes, marathons), public figures (celebrities, politicians, the royal family), and/or natural catastrophes (hurricanes, fires, earthquakes) can often offer more diverse and more timely coverage than professional news crews. These live eyewitness perspectives can be advantageous to third party media content providers (e.g., television networks, digital newspapers, and internet news sites), as well as news consumers.

In an exemplary embodiment of the present invention, a media server is disclosed, and comprises one or more non-transitory computer-readable memory devices upon which at least one set of instructions are stored, one or more processors, a request module, an authentication module, a filtering module, a publishing module, and a commercialization module. The one or more processors are electronically coupled with the one or more computer-readable memory devices to implement the at least one set of instructions. The request module is electronically coupled with the one or more non-transitory computer-readable memory devices for requesting data associated with media content from one or more remote electronic devices electronically coupled with the media server. The authentication module is electronically coupled with the one or more non-transitory computer-readable memory devices for verifying one or more permissions associated with one or more units of media content received by the request module. The filtering module is electronically coupled with the one or more non-transitory computer-readable memory devices for detecting whether one or more criteria have been met with respect to data associated with the media content received from the one or more remote electronic devices. The publishing module is provided for transmitting the data associated with media content received from the one or more remote electronic devices. The commercialization module is provided for associating data corresponding to an offer for compensation to a request for data associated with media content.

In embodiments, the filtering module detects one or more criteria within metadata associated with media content from the one or more remote electronic devices.

In embodiments, the filtering module detects one or more criteria from data attached by a tagging module of the media server to data associated with media content received from the one or more remote electronic devices.

In embodiments, the filtering module is configured to apply digital signal processing to data associated with media content received from the one or more remote electronic devices.

In embodiments, the one or more criteria relates to a location from which data associated with media content received from the one or more remote electronic devices is generated.

In embodiments, the one or more criteria relates to the subject matter of media content received from the one or more remote electronic devices.

In embodiments, the commercialization module is configured to apply data associated with a license agreement to data associated with media content received from the one or more remote electronic devices.

In embodiments, the media server further comprises an encoder module configured to format data associated with media content into a format for display on one or more remote electronic devices.

In embodiments, the authentication module is configured to issue a cryptographic key to accompanying a request for data associated with media content from the one or more remote electronic devices.

In embodiments, the authentication module is configured to encrypt one or more portions of a request for data associated with media content.

In embodiments, the publishing module is configured to transmit data associated with multiple units of media content for display on the one or more remote electronic devices.

In embodiments, the data associated with the multiple units of media content are related by at least one of the group consisting of: content, genre, and type.

In embodiments, the multiple units of media content are related by associated metadata.

In an exemplary embodiment of the present invention, a computer-implemented method is disclosed, and comprises: (a) requesting, by a media server having one or more processors configured to read one or more instructions of a set of instructions stored on a non-transitory computer-readable medium, data associated with media content from one or more remote electronic devices electronically coupled with the media server; (b) applying, by a commercialization module of the media server, data associated with one or more offers for compensation to a request for data associated with media content; (c) analyzing, by a filtering module of the media server, data associated with media content received from the one or more remote electronic devices to determine if one or more criteria are met; (d) encoding, by an encoder module of the media server, the data associated with media content received from the one or more remote electronic devices; and (e) publishing, by a publishing module of the media server, the data associated with media content received from the one or more remote electronic devices.

In embodiments, the method further comprises the step of attaching, by a tagging module of the media server, one or more sets of data to the data associated with media content.

In embodiments, the method further comprises the step of applying, by the filtering module, digital signal processing to data associated with media content received from the one or more remote electronic devices.

In embodiments, the one or more criteria relates to a location from which the data associated with media content received from the one or more remote electronic devices is generated.

In embodiments, the one or more criteria relates to the subject matter of the media content received from the one or more remote electronic devices.

In embodiments, the method further comprises the step of encrypting, by the authentication module, a portion of the request for data associated with media content.

In embodiments, the step of publishing includes publishing data associated with multiple units of media content.

BRIEF DESCRIPTION OF THE DRAWINGS

Various exemplary embodiments of this invention will be described in detail, with reference to the following figures, wherein.

DETAILED DESCRIPTION

Figure 1:
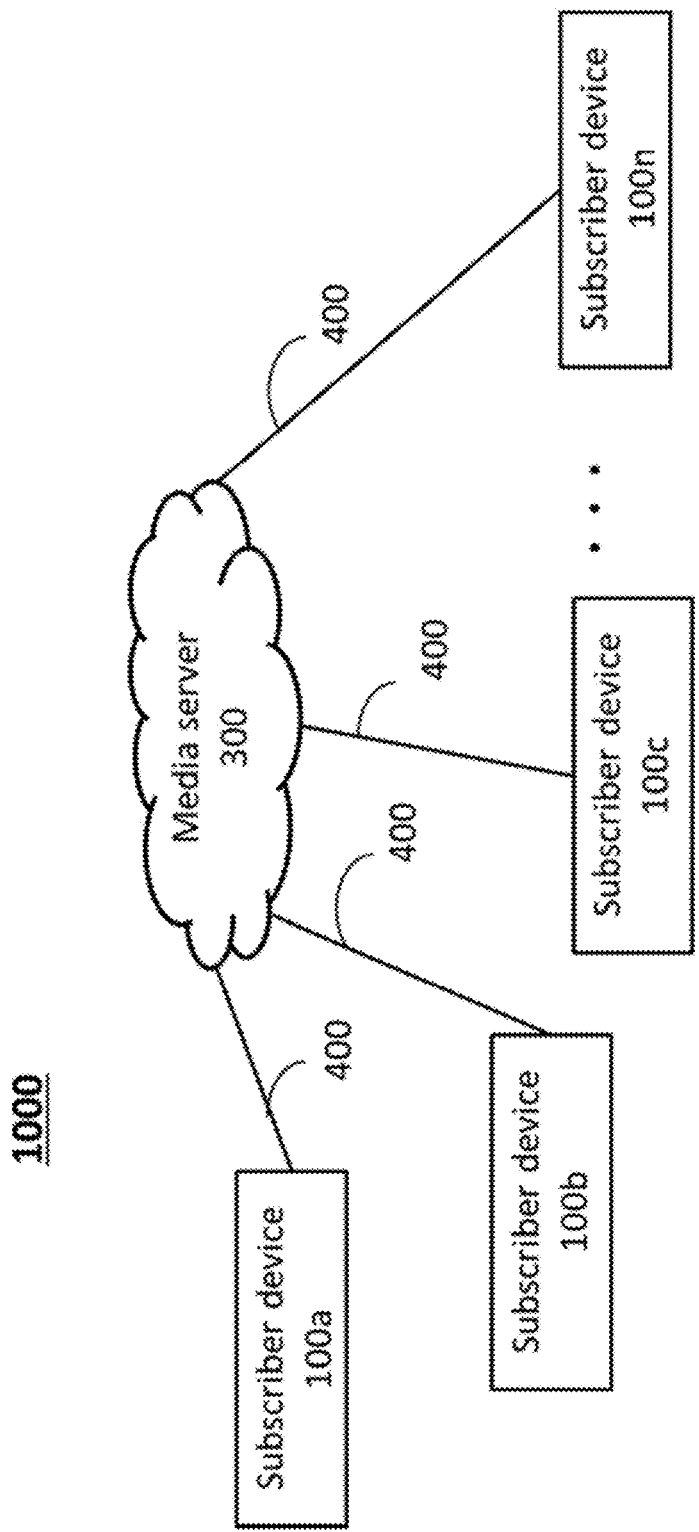
FIG. 1 is a schematic diagram of a media distribution network according to an exemplary embodiment of the present invention.

The present invention generally relates to a media distribution network and components thereof, associated program products, and methods of using the same.

The present invention is directed to a media distribution network having a media server that facilitates the receipt of media content from a plurality of subscriber devices or other electronic devices or electronic sources connected across the media distribution network. Thus, a media distribution network is disclosed that provides a centralized platform to which media content can be uploaded by a plurality of users or entities capable of electronically transmitting data associated with media content.

In this regard, a media distribution network may be provided through which a plurality of users with associated subscriber devices or other electronic devices can act as agents of major media content providers through an efficient and substantially automated system that obviates the cumbersome need, for example, to call in tips, email, use social media, or otherwise transmit media content for vetting, and/or engage in discussions with a representative of an established media content provider before media content is published for viewing by the public. Such a media distribution network may allow amateurs and/or other individuals to themselves become media content creators and/or providers in the vein of on the scene reporting agents, while providing major media content providers with a vastly increased, accessible, and sortable pool of media content.

As described herein, media content may be in the form of data associated with audible sounds and/or visual images, such as two-dimensional content, for example, still images or video, and/or three-dimensional content, for example, holographic displays. Media content described in exemplary embodiments herein may be live, e.g., streaming or substantially realtime content, or may be pre-recorded and/or stored for later distribution. In exemplary embodiments described herein, a unit of media content can be, for example, a movie, a clip, a song, broadcast, and/or a portion thereof, to name a few.

Program products associated with the disclosed media distribution network may include websites or other electronic platforms such as computer program applications that can be run on one or more subscriber devices having one or more non-transitory storage devices upon which instructions can be read, for example, by one or more processors or other computing devices, so that media content can be displayed and/or projected on the one or more subscriber devices.

The disclosed media distribution network may provide a compensatory incentive for a creator and/or provider of media content across the media distribution network. In such embodiments, the disclosed media distribution network may be configured to provide for terms of sale and/or licensing of a unit of media content upon transmittal by a user to the media distribution network.

Turning to FIG. 1A, an exemplary embodiment of a media distribution network is generally designated 1000. Media distribution network 1000 includes a plurality of subscriber devices 100a, 100b, 100c . . . 100n in electronic communication with a media server 300. In embodiments, media distribution network 1000 may include a different number of subscriber devices than shown, in different combinations and separations. In embodiments, media distribution network 1000 may include a plurality of media servers having similar or different configurations.

Subscriber devices 100a, 100b, 100c . . . 100n may be electronic devices configured to receive, record, and/or transmit media content in an electronic format (e.g., a digital format) to media server 300. Subscriber devices 100a, 100b, 100c . . . 100n are configured to display and/or project media content in a format that is visible, audible, and/or otherwise capable of being received by a human operator of the respective subscriber device.

Still referring to FIG. 1, the plurality of subscriber devices 100a, 100b, 100c . . . 100n are in electronic communication with media server 300 across a data network 400. Data network 400 may be a wired and/or wireless data communication system, such as the Internet, a mobile data network (e.g., cellular or satellite), and/or a local intranet, to name a few. Data network 400 may be configured as or include a mesh network, e.g., a network formed of one or more local modalities of data communication, for example, Wi-Fi, infrared, and/or Bluetooth data transmission, to name a few. In this regard, the plurality of subscriber devices 100a, 100b, 100c . . . 100n may be electronically connectable to media server 300 through one or more alternative channels in the event that traditional modalities of data connectivity are unavailable, for example, natural disaster or incidental disruption and/or deliberate blockages such as in the case of governmental censorship or monitoring (for example, in regions where civil unrest is occurring).

Accordingly, subscriber devices 100a, 100b, 100c . . . 100n and/or portions of media server 300 may include interface software and/or hardware, such as that necessary to support wired or wireless and connections and/or communications for connection to media server 300 across data network 400. Wired connections may be adapted for use with, for example, cable, POTS (telephone), fiber (such as Hybrid Fiber Coaxial), xDSL, to name a few, and wired connections may use coaxial cable, fiber, copper wire (such as twisted pair copper wire), and/or combinations thereof, to name a few. Wireless connections may include any cellular or cellular data connections (e.g., digital cellular, PCS, CDPD, GPRS, CDMA2000, Ev-DO, HSPA, UMTS, to name a few), Bluetooth, Wi-Fi, radio, satellite, infrared connections, and/or other electromagnetic waves, to name a few. Interface hardware and/or software, which may be used to communicate over wired and/or wireless connections, may comprise any of Ethernet interfaces (e.g., supporting a TCP/IP stack), X.25 interfaces, T1 interfaces, and/or antennas, to name a few. One or more communications portals (e.g., a communications portal of a device) may handle, process, support, and/or perform any wired and/or wireless communications and may comprise hardware and/or software.

Figure 2:
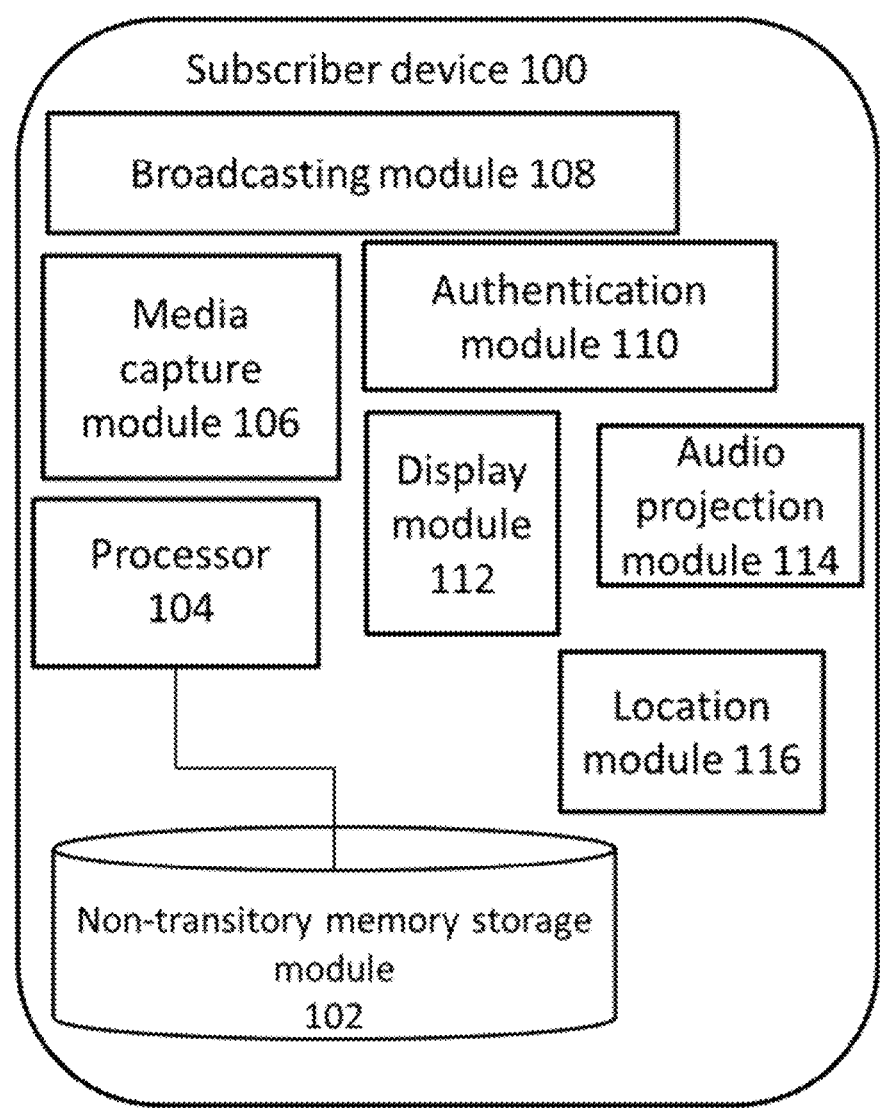
FIG. 2 is a schematic diagram of a subscriber device compatible for use with the media distribution network of FIG. 1.

Referring additionally to FIG. 2, a schematic diagram of a subscriber device 100 that may be electronically connected to media distribution network 1000 is illustrated. Subscriber device 100 as described herein may be representative of or similarly configured to any of subscriber devices 100a, 100b, 100c . . . 100n. In embodiments, one or more of subscriber devices 100a, 100b, 100c . . . 100n may have different a configuration than subscriber device 100.

Subscriber device 100, as described above, may be a portable electronic device configured to receive, record, and/or transmit media content to media server 300 across data network 400. Subscriber device 100 may be configured to display and/or project media content in a format that is visible, audible, and/or otherwise capable of being received by a human operator of the subscriber device. Such user devices may include smartphones, tablet computers, laptop computers, desktop computers, smart (e.g., networked) television devices, and/or wearable computers such as smartwatches or other bodily-mounted computing devices, e.g., Google Glass™ or a GoPro™ camera device, to name a few.

As shown, subscriber device 100 as shown may include one or more modules for handling various processes associated with the generation and/or transmission of media content for later distribution across network 1000. Modules described herein with respect to subscriber device 100 may be hardware elements and/or may include machine-readable instructions such as computer code which may be stored on the one or more non-transitory memory storage devices and run by one or more processors. In embodiments, any function attributed to any module described herein may be performed wholly or in part by one or more other modules.

In embodiments, subscriber device 100 may be configured to run a program product, e.g., a computer program or other machine-implementable instructions associated with media server 300. Accordingly, subscriber device 100 may include one or more non-transitory memory storage modules 102 upon which computer-readable instructions may be read. In embodiments, subscriber device 100 may include one or more processors 104 electronically coupled with the one or more non-transitory memory storage modules 102 so that an application program or other computer code associated with media server 300 can be run on subscriber device 100.

In the exemplary embodiment shown, subscriber device 100 includes a media capture module 106. Media capture module 106 is configured to transform physical inputs, e.g., detectable light and/or sound, into data to form electronic media content. In this regard, media capture module 106 may be electronically connected with a hardware sensor configured to detect light, for example, a camera and/or a hardware sensor configured to detect sounds, such as a microphone. In embodiments, subscriber device 100 may be configured to generate media content without the need for a physical input, for example, through the use of computer-generated images and/or audio, for example, an animation software program. In embodiments, subscriber device 100 may generate media content through a combination of capturing of physical inputs as described above as well as the use of computer-generated images and/or audio. Subscriber device 100 may contain software to manipulate media content generated through the capture of physical inputs, for example, a filter applied to an image captured by subscriber device 100.

Subscriber device 100 may also include a broadcasting module 108 that can transmit media content generated on subscriber device 100 to media server 300. In embodiments, broadcasting module 108 may also tag or otherwise associate identifying information, e.g., metadata, with media content being transmitted from subscriber device 100 so that the media content may be appropriately redirected across media server 300, as described further herein. Broadcasting module 108 may be configured to tag or otherwise associate identifying information input directly by a user (e.g., a human or computer-controlled operator of subscriber device 100), for example, title information or descriptive information, as described further herein.

As shown, subscriber device 100 may also include an authentication module 110 for communicating with media server 300 to obtain allowance and/or permissions associated with the transmission of media content to media server 300. In this regard, authentication module 110 may be configured to provide encryption and/or decryption of data to verify an identity and/or permissions of a user associated with subscriber device for the purposes of transmitting media content to media server 300, as described further herein. In embodiments, authentication module 110 may generate and/or store a variety of data for such purposes, for example, usernames or other identifying information, passwords, cookies or other electronic tags, challenge questions, and/or cryptographic keys, to name a few.

In the exemplary embodiment shown, subscriber device 100 may include a display module 112 for receiving, converting, and/or displaying media content received from media server 300. In embodiments, display module 112 may display media content created and/or stored on subscriber device 100. In embodiments, display module 112 may be configured to display visual images, such as 2D images, e.g., still images or video, or 3D images such as holographic images. Accordingly, display module 112 may be electronically connected with a visual display hardware element, for example, an LCD screen. In this regard, display module 112 can be used to preview and/or view in realtime media content that is being captured for later transmission to and/or distribution by media server 300.

In embodiments, subscriber device 100 may include an audio projection module 114 for receiving, converting, and/or projecting of audio media content supplied by media server 300 or stored onboard or generated by subscriber device 100. Such an audio projection module 114 may be configured to cause the operation of a hardware element of subscriber device 100, for example, an audio speaker.

In embodiments, subscriber device 100 may include a location module 116 for determining a location of subscriber device 100 and/or transmitting location information to media server 300. Location module 116 may include one or more hardware and/or software elements configured to determine a geographic location in which a subscriber device 100 is located, for example, a mobile data antenna and/or GPS antenna. As described herein, media server 300 may determine a location of a subscriber device based upon a location module (e.g., location module 116 of subscriber device 100) for a filtering determination of media content provided by the subscriber device.

Figure 3:
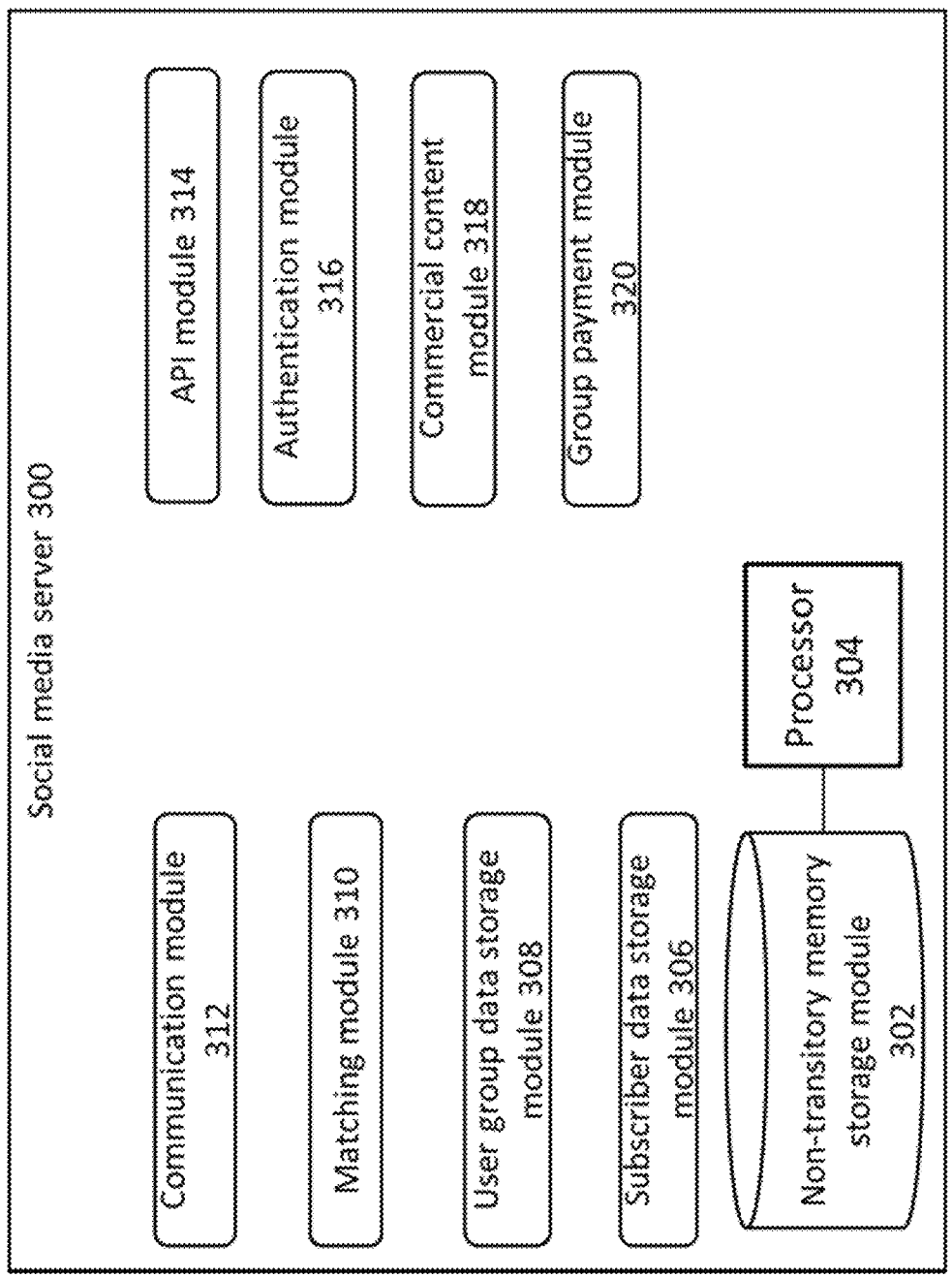
FIG. 3 is a schematic diagram of a media server compatible for use with the media distribution network of FIG. 1.

Still referring to FIG. 1 and FIG. 2, and referring additionally to FIG. 3, media server 300 is illustrated. Media server 300 may be configured to receive, store, manipulate and/or transmit for display and/or projection electronic data corresponding to media content across media distribution network 1000. In embodiments, media server 300 may transmit for display and/or projection electronic data corresponding to media content across a third party network in addition to or alternative to media distribution network 1000.

Media server 300 may include one or more real and/or virtual data servers, such as in a cloud computing environment, so that data can be transmitted between different components of media server 300. Media server 300 or portions thereof may be provided, owned, and/or operated by a single entity, such as a natural person, or a legal entity, such as a company or service.

In embodiments, media server 300 is configured to carry out a series of steps or processes directed to electronic data corresponding to media content transmitted across and/or external to media distribution network 1000. Such steps may be one or more sets of instructions, rules, boundaries, and/or algorithms, to name a few, that result in the manipulation, modification, and/or transformation of a portion of the electronic data corresponding to media content.

In this regard, the entirety of or portions of media server 300 may be formed of one or more computer systems having one or more computers or portions thereof. The computers may store data in one or more databases stored on storage devices having one or more computer-readable memory storage devices 302. In embodiments, the one or more computer-readable memory storage devices 302 may be, for example, hard drives, flash memory, tapes, disks, CDs, DVDs, memory cards, server farms, and any hardware necessary to read and/or write to such non-transitory memory, such as disk drives, automatic or robotic disk loaders, CD drives, memory card writers, to name a few. As described herein, media server 300 may have one or more modules that may include hardware elements and/or associated computer-readable code that can be run by one or more processors 304 that are electronically coupled with the non-transitory memory stores 302 of the computers. In embodiments, the modules may provide user interfaces for interacting (e.g., inputting data and/or receiving data) with a computer system. Accordingly, any of the computers may also include input devices (e.g., keyboards, cameras, touchpads, computer mouse devices, touchscreens, microphones) with accompanying computer-readable code (e.g., speech-to-text software) and/or display devices (e.g., monitors, touchscreens, projectors (e.g., 2-D, 3-D, and/or holographic projectors to name a few).

In embodiments, any function attributed to any module described herein may be performed wholly or in part by one or more other modules. In embodiments, a module may access a third party system or server to perform the ascribed functions.

As described herein, media server 300 receives data associated with media content from subscriber devices 100a, 100b, 100c . . . 100n, e.g., from a broadcasting module 108 of a subscriber device (e.g., broadcasting module 108 of subscriber device 100). In embodiments, media server 300 receives and/or transmits data associated with media content to subscriber devices 100a, 100b, 100c . . . 100n and/or to other electronic devices and/or networks, for example, electronic devices on a third party network and/or a server associated with a third party network. In this regard, media server 300 receives, manipulates and/or transforms (e.g., curates), and distributes media content received from one or more subscriber devices 100a, 100b, 100c . . . 100n.

Accordingly, media server 300 includes a publishing module 310 for transmission of media content for display and/or projection on one or more of subscriber devices 100a, 100b, 100c . . . 100n. In embodiments, media server 300 may transmit data associated with media content for display on an electronic device other than a subscriber device. In embodiments, publishing module 310 can upload media content onto an outward-facing (e.g., subscriber-facing) platform, for example, a website hosted by a portion of media server 300, or a program product associated with media distribution network 1000, for example, a computer device and/or tablet application.

In embodiments, publishing module 310 may upload media content to a network or server external to media distribution network 1000, for example, a third party network or server owned and/or operated by a commercial media content provider.

In embodiments, publishing module 310 may upload media content onto an outward-facing platform through an electronic device having one or more primary functions other than communication with media server 300, for example, a conventional or networked (e.g., "smart") television set. In such embodiments, publishing module 310 may transmit for display media content over a cable or digital television channel.

In embodiments, publishing module 310 may communicate one or more portions of computer-readable code associated with a third party media content provider, for example, a website or other third party hosted platform. In embodiments, a third party media content provider may be an entity whose operations are not primarily web-based, for example, a network television entity (which may be terrestrial or web-based), a social media platform (such as a streaming video service, satellite media content provider, video news aggregator, digital video recorded (DVR'd) media content, and/or electronic news publisher, to name a few.

In embodiments, publishing module 310 may communicate with an application programming interface (API) or other utility made available by a third party media content provider, such that media content data transmitted to subscriber devices 100a, 100b, 100c . . . 100n may appear in the form of, for example, an embedded video player.

In embodiments, publishing module 310 may provide a queue of units of media content that may be sorted by, for example, creation date, keyword or subject matter, or creator, to name a few. Third party media content providers may subscribe and/or display to such a queue of units of media content, for example, as an embedded queue of videos that are visible on a portion of a website or program product.

In embodiments, media server 300 may provide a map view, e.g., as an enlargeable icon or thumbnail or as a full-view element adjacent a traditional unit of media content that is currently being displayed and/or projected to a viewer, for example, a news article or television program. Such a map element may include representations of the relative and/or actual locations of elements of media distribution network 1000 that are related to the traditional unit of media content currently being displayed and/or projected, for example, locations of subscriber devices and/or already-published units of media content relating to the same.

As shown, an encoder module 320 may be provided for converting data associated with media content into a format viewable on subscriber devices 100a, 100b, 100c . . . 100n or on other electronic devices. In this regard, encoder module 320 may transform data associated with media content into one or more output formats suitable for viewing on subscriber devices 100a, 100b, 100c . . . 100n or other electronic devices. For example, a video may be encoded for display on an Android device, an iOS device, and/or a Windows device, to name a few. As such, media content such as a video may be encoded into multiple formats, such as .mp4, .mov, and .wmv, to name a few. In embodiments, media content may be encoded in a format optimized for streaming, such as .flv for videos. Streaming portions of media content may provide a preview of not yet downloaded media content. In embodiments, encoder module 320 may output standard and/or high definition versions of media content. In embodiments, media server 300 may be devoid of an encoder module, e.g., media server 300 may be configured to receive, store, and/or transmit data associated with media content in a format determined at the source of generation of the media content, e.g., one or more of subscriber devices 100a, 100b, 100c . . . 100n. In embodiments, media server 300 may optionally bypass encoder module 320 when receiving data associated with media content, e.g., when the received media content originates in a format compatible for display on one or more of subscriber devices 100a, 100b, 100c . . . 100n or other electronic devices.

As described herein, media server 300 transmits media content associated with certain criteria (e.g., rules, conditions, boundaries, etc.) to one or more of subscriber devices 100a, 100b, 100c . . . 100n and/or to other electronic devices. Accordingly, media server 300 may include a filtering module 330 for detecting the presence (or absence) one or more sets of pre-determined data with one or more sets of data associated with units of media content transmitted from subscriber devices 100a, 100b, 100c . . . 100n, e.g., to select the most or a set of the most desirable units of media content among a set of available units of media content. Such sets of data may relate to, for example, topic, title, location, creation date, and/or device type (such as smartphones, head-mounted displays, or GoPro), to name a few. In this regard, an administrator and/or operator of media server 300 may set a predetermined radius from an unfolding event within which a generator of media content must be located in order to be eligible for his or her media content to be distributed across network 1000.

Filtering module 330 may analyze data associated with media content for a threshold level of image quality (e.g., resolution, camera angle, and/or image steadiness) and/or the presence of restricted content (e.g., adult, violent, and/or obscene content). Such analysis to data associated with media content may be performed, for example, through object, facial, speech, and/or image recognition software, such as open source (e.g., OpenCV) or proprietary (e.g., NEUROtechnology) digital signal processing.

Filtering module 330 may detect inconsistencies among different sets of data associated with media content. For example, filtering module 330 may discard data associated with media content when metadata is inconsistent with user-input data (for example, metadata associated with the location of the source of creation of the media content is inconsistent with a "LIVE" title or description of the media content when the location of the source of creation of the media content is not near the actual event or subject of the media content).

Any of the above factors and/or criteria may be used in assigning a numerical score or ranking to data associated with a unit of media content that has been uploaded to media server 300. For example, data associated with media content within which newsworthy or otherwise desirable media content has been detected (e.g., by object, speech, facial, and/or image recognition software) may be assigned a relatively higher score of rank, for example, in the case of sirens, gunfire, or other indicators of an unfolding event. Filtering module 330 may be configured to discard or bypass data associated with media content having a numerical score or ranking at or below a threshold value. In this regard, filtering module 330 may be operatively connected with publishing module 310 to publish particular units of media content, as described further herein.

Media server 300 may include a tagging module 340 configured to associate data with received units of media content. Such data may be visible upon display and/or projection of the media content on an electronic device, e.g., overlaid upon and/or adjacent to the unit of media content being displayed and/or projected on an electronic device. Such data may be embedded with the data associated with the unit of media content, e.g., metadata.

Data applied to units of media content by tagging module 340 may be manually entered, e.g., by a system administrator or other entity.

Tagging module 340 may automatically associate data with a particular unit of media content based upon information received from the point of generation of the unit of media content, e.g., location and/or electronic device type. Such data can be derived, for example, through object, facial, speech, and/or image recognition software as described above with respect to filtering module 330. For example, if a spoken language can be identified, it may be encoded as a value associated with a language tag, for example, {"language":"en"}. If a location can be determined from visible features of media content, it may be encoded as a coverage tag, for example, {"coverage": "Paris"}. A characteristic of media content may be encoded as a type tag, for example, {"type":"StillImage"}. If a characteristic of appropriateness of content of media content can be determined, it may be encoded as an audience tag, for example {"audience": "adults"}.

Accordingly, tagging module 340 may be configured to associate data with units of media content that may be used to identify, for example, content type (world news, national news, breaking news, etc.), age appropriateness, discretionary content (e.g., adult themes or violence), and/or content provider information (e.g., professional affiliations and/or past ratings or history), to name a few. Such data can be derived from descriptive information accompanying a unit of media content (e.g., title, description, etc.) and/or from metadata attached to the data associated with the unit of media content.

Tagging module 340 may be configured to associated data related to a user's past history or reputation based upon prior creation and/or transmittal of data associated with media content across media distribution network 1000. In this regard, a user may be assigned a ranking based upon, for example, number of uploads of media content to media server 300, length of time since his or her first upload of media content to media server 300, and/or rankings by viewers of the user's media content, to name a few.

Media server 300 may include a commercialization module 350 through which one or more units of media content received from subscriber devices 100*a*, 100*b*, 100*c* . . . 100*n* can be offered for sale and/or license to one or more third party services. Commercialization module 350 may be configured to attach data to a unit of media content associated with a license agreement and/or terms of sale to a recipient of the media content, e.g., a third party network or media content distributor.

As described above, media server 300 is configured to communicate with and receive data associated with media content from one or more of subscriber devices 100*a*, 100*b*, 100*c* . . . 100*n*. Accordingly, media server 300 includes a request module 360 to request specific types of media content from one or more of subscriber devices 100*a*, 100*b*, 100*c* . . . 100*n*. In this regard, request module 360 may initiate a request across media distribution network 1000 for media content associated with a certain topic or "breaking" event. Request module 360 may poll various electronic sources (e.g., news aggregators and social media platforms, to name a few), for example, through an automated tracking program or bot, in order to obtain breaking or trending topics that would form the basis for timely requests for media content for issuance across media distribution network 1000.

Request module 360 may be configured to initiate a function of subscriber devices 100*a*, 100*b*, 100*c* . . . 100*n* electronically connected to media server 300, e.g., activate a camera and/or microphone device of one or more of subscriber devices 100*a*, 100*b*, 100*c* . . . 100*n* upon issuance of a request for media content. In such embodiments, request module 360 may initiate additional or alternative functions of a subscriber device (e.g., one or more of subscriber devices 100*a*, 100*b*, 100*c* . . . 100*n*), for example, ending a currently-running and/or scheduled application program, silencing notifications and/or alerts, and or initiating transmission of data associated with media content to media server 300 (e.g., via broadcasting module 108 of a subscriber device).

In embodiments, media server 300 includes an authentication module 370 through which an identity and/or authorization of a user associated with one or more of subscriber devices 100*a*, 100*b*, 100*c* . . . 100*n* can be verified. Authentication module 370 may be configured to verify an identity and/or permissions for taking actions across media distribution network 1000 by one or more users through the issuance and/or receipt of verification data, which may include usernames, email addresses, passwords, challenge questions, cookies or electronic tags, and/or cryptographic keys, to name a few.

Request module 360 and authentication module 370 may coordinate to issue a request for media content across media distribution network 1000 in a way such that only authorized or desirable users (from the perspective of an entity controlling and/or purchasing media content from media server 300) can transmit media content to media server 300.

Accordingly, media server 300 may issue a request for media content, via request module 360 and/or authentication module 370, in the form of a digital token or other data set issued to one or more of subscriber devices 100*a*, 100*b*, 100*c* . . . 100*n*.

Such a data set may include a character string that includes an at least partial description of the type of media content being requested. Such a character string may follow a specific structure that is standardized by media server 300.

A character string associated with a request for media content may have a form similar to:

<Coral tag indicator><tag>[:<restriction>][@<target UB>].

Such a character string may be displayed and/or projected on one or more of subscriber devices 100a, 100b, 100c . . . 100n in the form of text and/or graphics, for example: "%2013Shutdown:Senate@JohnDoe".

In embodiments, users may create and/or transmit media content to media server 300 without first receiving a specific prompt from request module 360. For example, request module 360 may continuously issue a request for media content of a general, "breaking" nature so that users who are the first on scene to a yet-unknown event can have the opportunity to have his or her media content published by media server 300. In such embodiments, data associated with this media content may be filtered by objective standards (e.g., image quality, user authentication) in addition to or alternative to review by a system administrator or other subjective operator of media server 300.

Request module 360 and/or authentication module 370 may issue a cryptographic key, which may be designated as a challenge key, as an encrypted series of bytes or data. In this regard, a true random set of bytes or data may be generated by request module 360 and/or authentication module 370, and may be encrypted with another set of data, for example, a public cryptographic key generated by a respective subscriber device 100a, 100b, 100c . . . 100n and stored upon authentication module 370.

Request module 360 and/or authentication module 370 may also transmit other data associated with descriptions and/or terms of a request for media content, for example, an internet address or other portal to which data associated with media content should be transmitted, an expiration date associated with the request, and/or an offer for compensation for media content that is the subject of the request.

Request module 360 and/or authentication module 370 may be configured to issue requests for media content to specific types of individuals and/or entities so that media content can be received from a desired source. For example, one or more requests for media content may relate to any individual and/or entity, to individuals and/or entities within a certain geographic region (e.g., in proximity to an event or location of ongoing interest), and/or to a professionally-affiliated individual and/or entity.

Request module 360 and/or authentication module 370 may include metadata with a request for media content. Such a request for media content may have the form of:

```
{"tag": "%2013Shutdown:Senate@JohnDoe",
    "challenge key": "2vPmzyYN4uzLVEZpJJcQ3yCBJptKZZfz",
    "address": "[2001:db8::ff00:42:8329]:35674",
    "expires": "2016-06-05T24:00Z",
    "offer": "US$ 10 per minute",
    "metadata":
    ["Creator": "John Doe",
    "Publisher": "XYZ News",
    "Language": "en",
    "Taglist": ["debt", "talks",
    "democrats", "republicans"]
    }
}
```

In this regard, one or more of subscriber devices 100a, 100b, 100c . . . 100n may be eligible to transmit data associated with media content to media server 300 in response to a request for media content. In the event that one or more of subscriber devices 100a, 100b, 100c . . . 100n accepts such a request for media content, the respective subscriber device may return a set of data to media server 300 (e.g., to request module 360 and/or authentication module 370). Such a set of data may include, for example, a cryptographic key and accompanying metadata, and may be transmitted in a variety of formats of machine-implementable instructions, for example, JSON.

A set of data transmitted to media server 300 from one or more of subscriber devices 100a, 100b, 100c . . . 100n may have the form of, for example:

```
{"response key": "ek2oat2StT4W01ID8pF0OREvx5dN6E6",
    "metadata":
    {"Creator": "John Doe",
    "Publisher": "XYZ News",
    "Language": "en",
    "Date": "2016-06-04T10:04Z",
    "Type": "video",
    "Tags": [:debt", "democrats", "interview"]
    }
}
```

Figure 4:
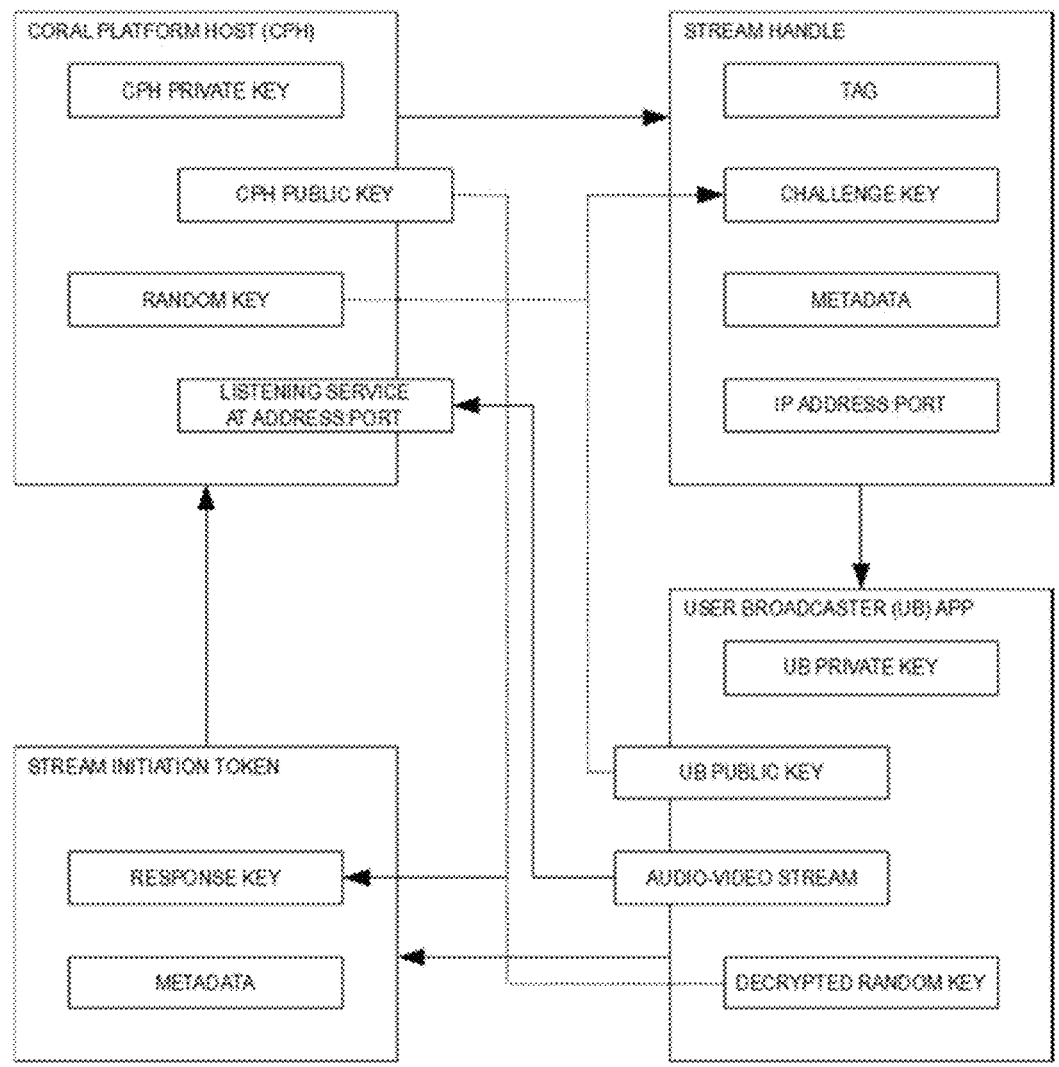
FIG. 4 is a schematic diagram of a portion of a media distribution network is illustrated during an authentication process between a media server and one or more subscriber devices according to an exemplary embodiment of the present invention.

Referring additionally to FIG. 4, a schematic diagram of the authentication process between a subscriber device (e.g., one or more of subscriber devices 100a, 100b, 100c . . . 100n) and media server 300 is illustrated according to an exemplary embodiment of the present invention. As shown, once media server 300 has received the set of data associated with a request for media content generated by request module 360 and/or authentication module 370, the media server 300 may, for example, decrypt this set of data with a private cryptographic key stored on a portion of media server 300.

In embodiments, media server 300 includes an administrator module 370 through which a system administrator (e.g., an agent or automated program of an owner and/or operator of media server 300) may initiate, pause, cancel, override, and/or alter one or more processes of media server 300. Accordingly, administrator module 370 may provide a system administrator with the capability, for example, to view and/or sort units of media content being transmitted through media server 300, manipulate the transmission of data associated with units of media content (e.g., interrupt, alternate, and/or simultaneously transmit data associated with two or more units of media content), and/or initiate communication with a creator of media content (e.g., to provide instructions or other information).

In this regard, administrator module 370 may provide an interface through which a third party media content provider (for example, a licensor or purchaser of media content through media server 300) may view information relating to processes occurring across media distribution network 1000, for example, the locations of users and/or associated subscriber devices. Such an interface may also provide a third party media content provider with the ability to initiate actions across media distribution network 1000, for example, generate and/or alter requests for media content and/or provide instructions for the same.

Figure 5:
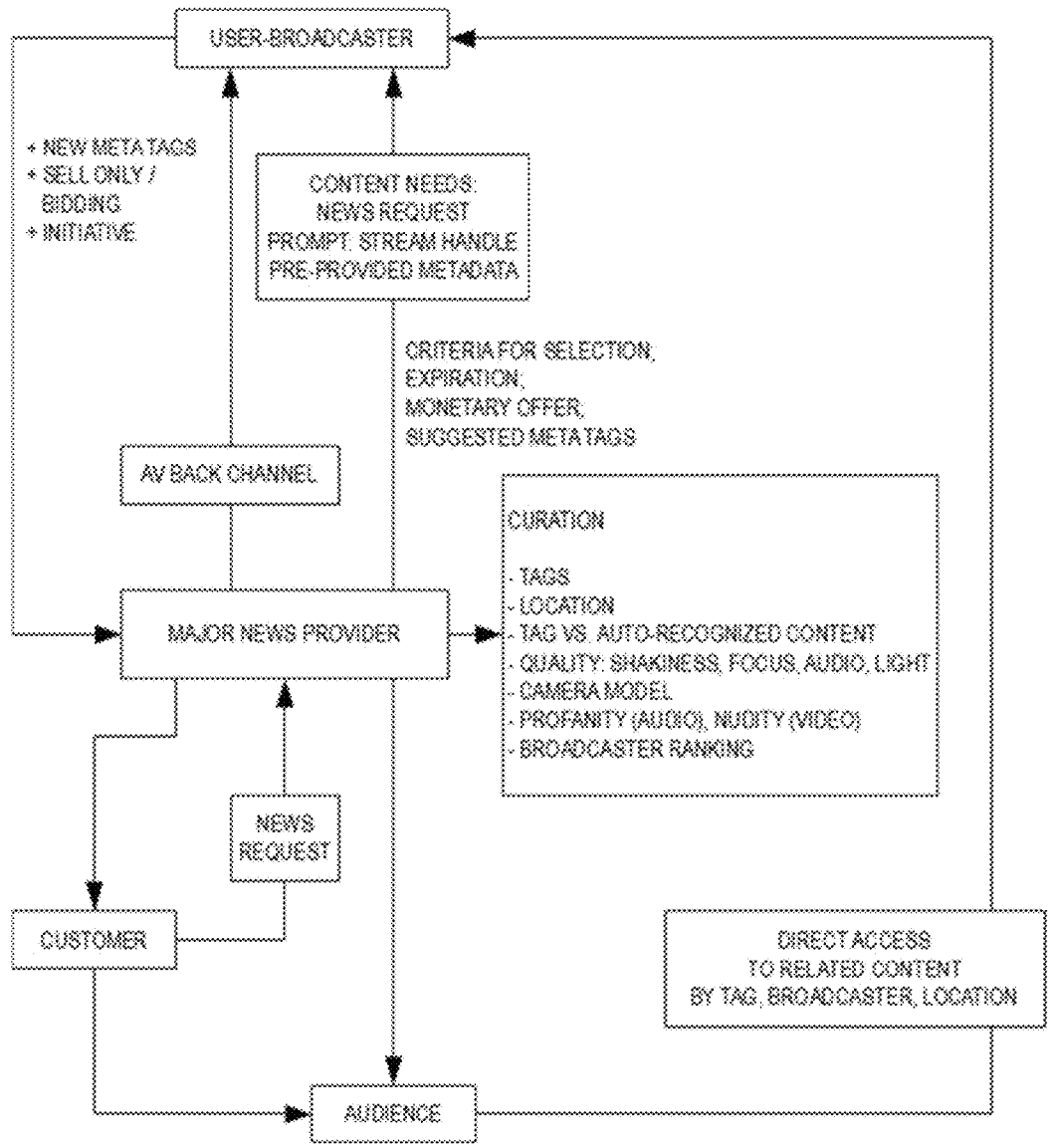
FIG. 5 is a schematic diagram of an embodiment of a media distribution network according to an exemplary embodiment of the present invention.

Still referring to FIG. 1, FIG. 2, and FIG. 3, and referring additionally to FIG. 5, a schematic diagram of media distribution network 1000 is illustrated according to an exemplary embodiment of the present invention.

It will be understood that media distribution network 1000 as described above may be used in different configurations and/or for different purposes. For example, media server 300 may be configured to broadcast or transmit for broadcast media content other than traditional news or news-related media content, for example, entertainment, sports, and/or television programming, to name a few. In embodiments, media distribution network 1000 may be configured such that individual users (as opposed to commercial content providers) may act as administrators and/or operators of media server 300, for example, through a computer program application. In such embodiments, individual users may be provided with substantial control over the creation, receipt, and/or distribution of media content.

Figure 6:
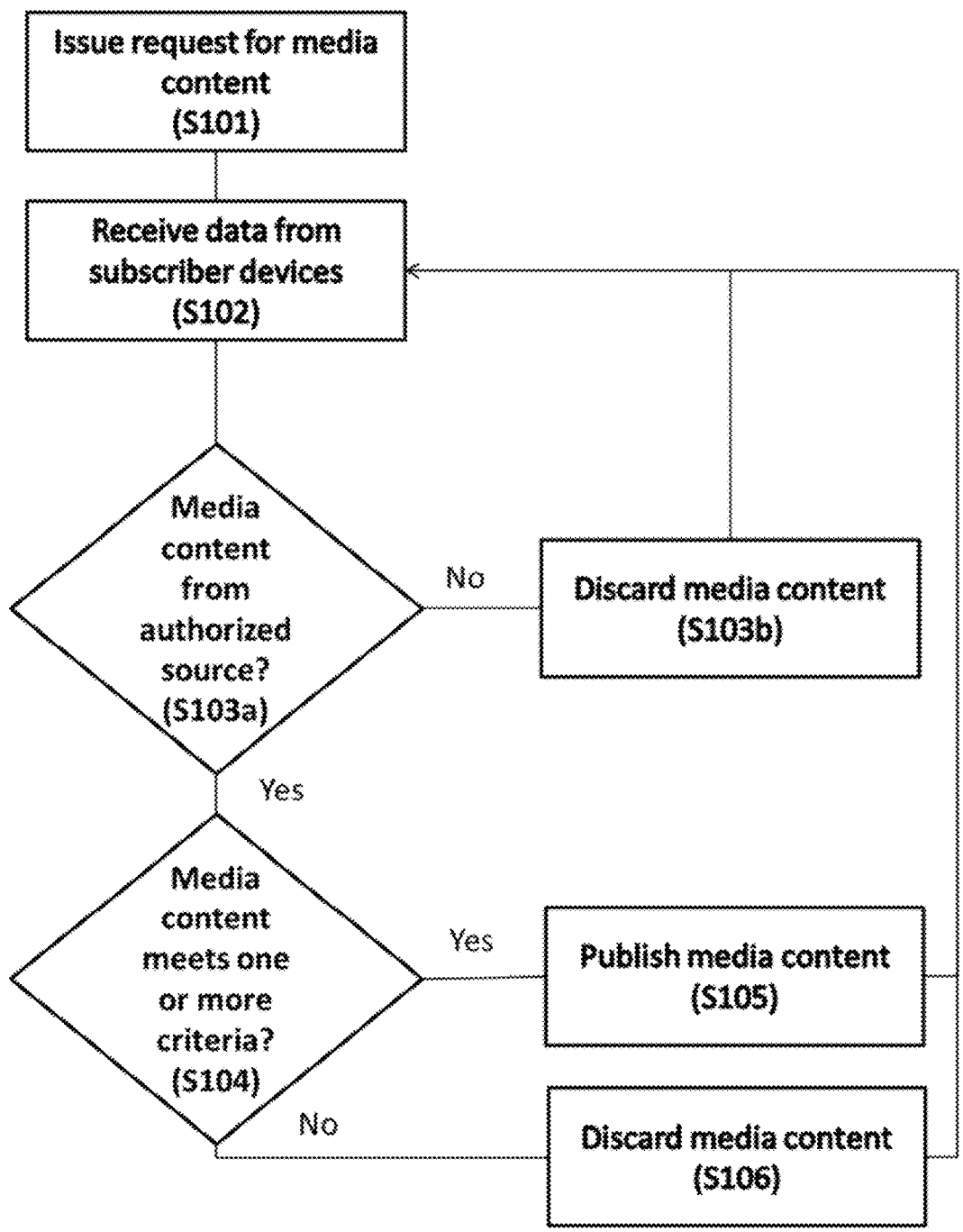
FIG. 6 is a flow chart illustrating a series of processes occurring across the media distribution network of FIG. 1 according to an exemplary embodiment of the present invention.

Still referring to FIG. 1, FIG. 2, and FIG. 3, and turning additionally to FIG. 6, a flow chart of a series of processes occurring across media distribution network 1000 is illustrated according to an exemplary embodiment of the present invention.

In a step S101, media server 300 transmits data associated with a request for media content, e.g., via request module 360. Concurrently and/or subsequently, media server 300 may issue one or more cryptographic keys, for example, via authentication module 370, for later verification of one or more of identifications and/or permissions of individuals or entities transmitting media content to media server 300.

In a step S102, media server 300 receives, for example, via request module 360, data associated with media content generated by one or more of subscriber devices 100a, 100b, 100c . . . 100n.

In a step S103a, media server 300 may determine, for example, via authentication module 370, whether data associated with media content transmitted by the one or more subscriber devices 100a, 100b, 100c . . . 100n is authorized and/or permitted for transmission to media server 300. If the data associated with a particular media content transmitted by the one or more subscriber devices 100a, 100b, 100c . . . 100n is determined as unauthorized and/or lacking one or more permissions by authentication module 370, the data associated with the particular unit of media content may be discarded, e.g., deleted or bypassed, from media server 300 in a step S103b. The process may then revert to step S102 above. Such an action may be accompanied by a notification to a respective user device 100a, 100b, 100c . . . 100n. If the data associated with a particular unit of media content is transmitted by the one or more subscriber devices 100a, 100b, 100c . . . 100n is determined as authorized and/or permitted by authentication module 370, the process proceeds as described below.

In a step S104, media server 300 may determine, for example, via filtering module 330, whether data associated with media content transmitted by the one or more media devices 100a, 100b, 100c . . . 100n meets one or more criteria defined by the request for media content that was issued via request module 360 (S102) and/or other criteria defined by media server 300. In embodiments, this step may occur before, concurrently, and/or subsequently to step S103a described above. If the media server 300 determines, via filtering module 330, that data associated with media content transmitted by the one or more media devices 100a, 100b, 100c . . . 100n meets the one or more criteria defined by the request for media content, the process may proceed to transmit media content to the one or more subscriber devices 100a, 100b, 100c . . . 100n or to other electronic sources in a step S105. If the data associated with the media content does not meet one or more criteria defined by the request for media content, the data associated with the particular unit of media content may be discarded, e.g., deleted or bypassed, from media server 300 in a step S106 and the process may revert to step S102 above.

Portions of media server 300 described above may be accessed by one or more subscriber devices (e.g., subscriber devices 100a, 100b, 100c . . . 100n) through an electronic portal such as the world wide web and/or via a program product configured for use with one or more subscriber devices. A program product may include software or other compute code stored on one or more non-transitory memory storage devices (e.g., non-transitory memory storage device 302) and executable by one or more processors (e.g., processor 304). Such program products may be configured for use on a Windows-based, iOS-based, Android-based, or Linux-based operating system, to name a few. Program products described herein may include on or more graphic user interfaces (GUIs) through which data associated with social media server 300 is displayed and/or projected in a format detectable by one or more human operators of subscriber devices connected across social media network 1000. GUIs of a program product as described herein can provide a control interface to a user or subscriber to input commands across social media server 300, e.g., through a hardware device such as a keyboard, mouse, trackball, sensor pad, microphone, motion-capture device and/or capacitive touchscreen, to name a few.

Figure 7A:
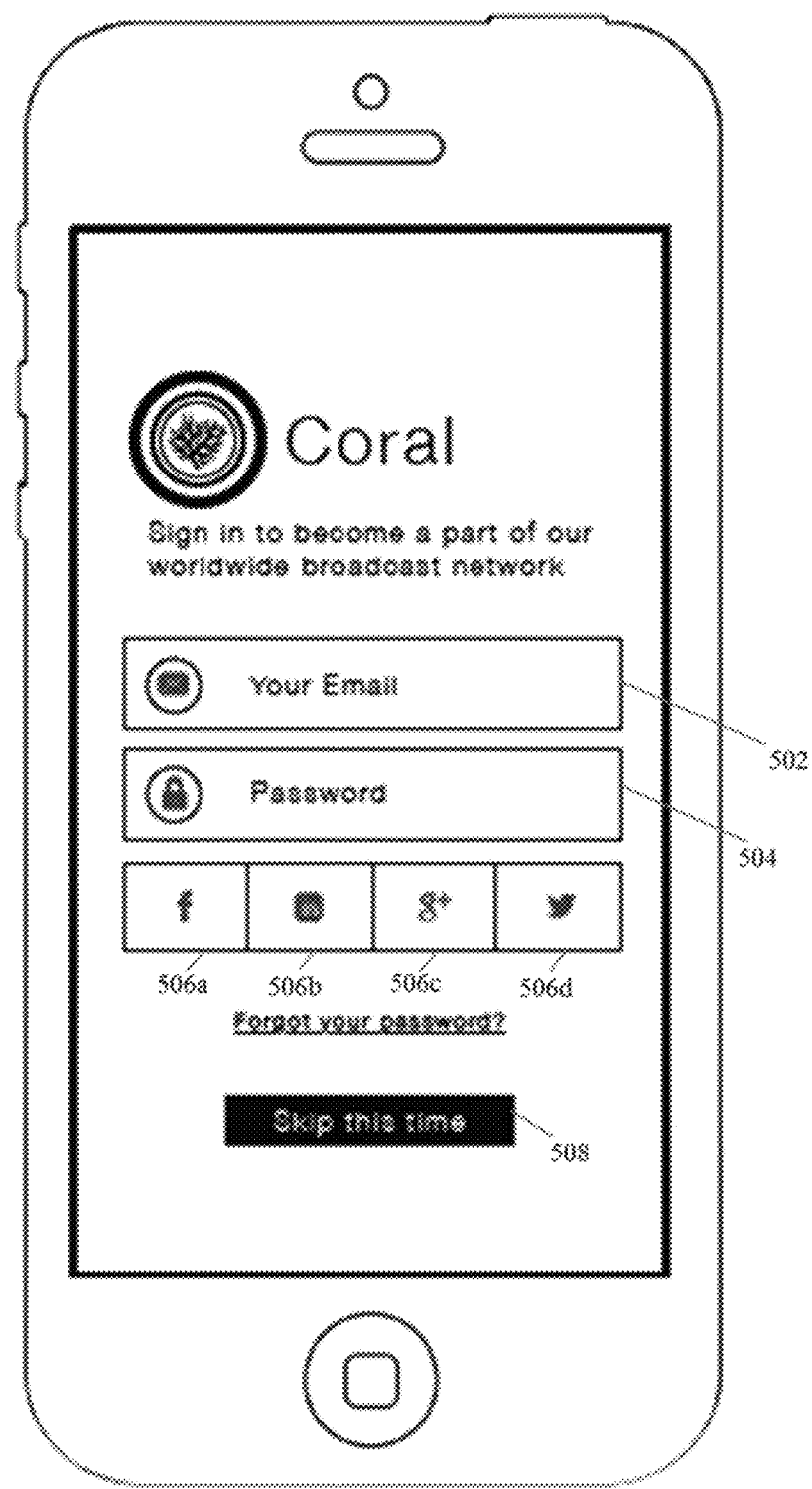
FIG. 7A is a screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7A, an exemplary GUI of a program product associated with social media server 300 is shown. As described herein, GUIs associated with an initial or startup function of a program product associated with media server 300 may display characteristic information related to a program product associated with social media server 300 or an owner entity thereof, for example "Coral". Such GUIs may include input fields 502, 504 for entry of identifying information of a user of a subscriber device or other electronic device upon which a GUI is displayed. In such embodiments, input fields 502, 504 may be used to receive text inputs corresponding, for example, to a username, email address and/or accompanying password. Such information may relate to an account or subscription of a user to a program product hosted on a portion of media server 300. Input fields 502, 504 may be used to input information that may be verified by comparison to data stored on a portion of media server 300, for example, authentication module 370. As shown, one or more icons 506a, 506b, 506c, 506d may be provided to facilitate connection with a third party service, e.g., via an API or embedded program element. Selection of such icons 506a, 506b, 506c, 506d may prompt a user for login information relating to a third party service, for example a third party social media network such as Facebook, LinkedIn, Google+, or Twitter, to name a few. An icon 508 may be provided to bypass a login step through a registered account and/or through connectivity through a third party service.

Figure 7B:
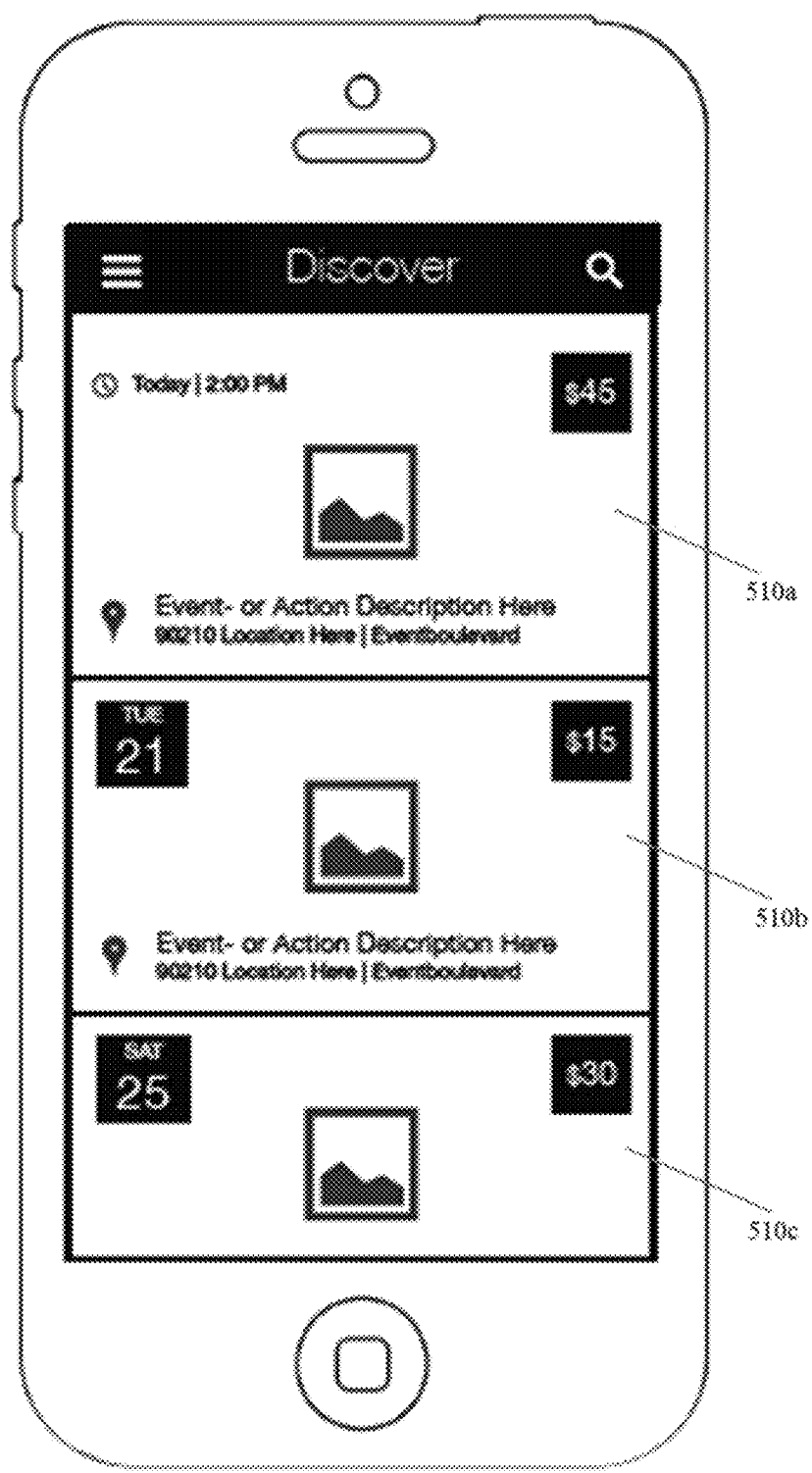
FIG. 7B is another screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7B, another GUI of a program product hosted by media server 300 is illustrated according to an exemplary embodiment of the present invention. As shown, a user may be provided with a selection of requests for media content issued by media server 300, as shown in fields 510a, 510b, 510c. Each field 510a, 510b, 510c may include identifying information relating to a specific request for media content, for example, a title, description, geographic location, an expiration date, and/or an offer for compensation. Accordingly, a visual representation of potential undertakings for media capture and upload to media server 300 by a user is presented.

Figure 7C:
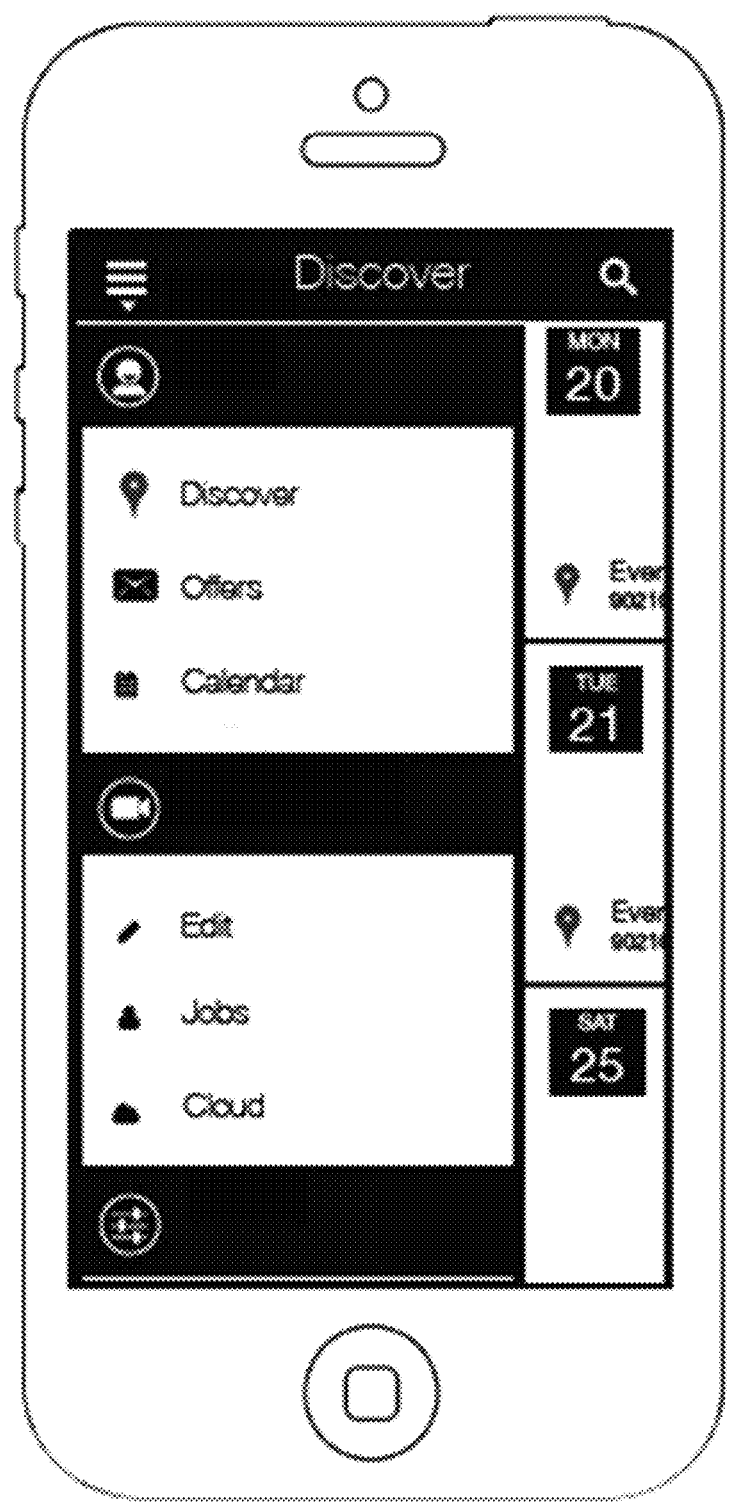
FIG. 7C is another screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7C, another GUI of a program product hosted by media server 300 is illustrated according to an exemplary embodiment of the present invention. As shown, a navigation panel may be provided to a user through which a user may discover pending offers and/or requests for media content and/or messages related to the same. A user may also be able to edit previously recorded or still-to-be transmitted media content, for example, that is stored on a portion of his or her electronic device. A user may also be provided with a number of administrative functions relating to the functionality of the program product on his or her electronic device, for example, preferences for alerts received from media server 300.

Figure 7D:
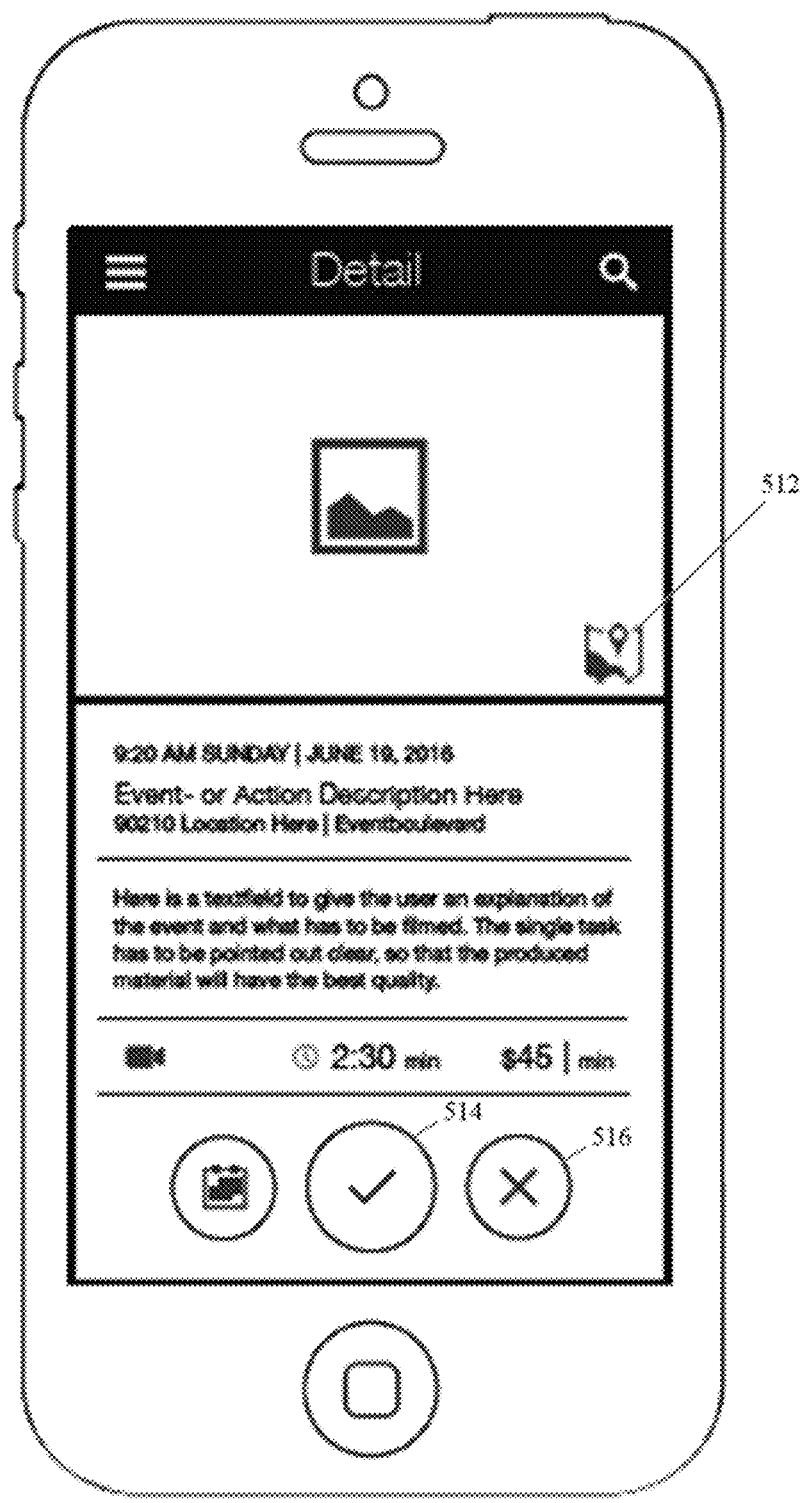
FIG. 7D is another screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7D, another GUI of a program product associated with media server 300 is illustrated according to an exemplary embodiment of the present disclosure. As shown, a detail view of a particular request for media content issued by media server 300 is shown. Expanded information such relating to title, description, geographic location, an expiration date, and/or an offer for compensation may be provided as compared to a thumbnail view of a particular request for media content as described above in FIG. 7B. In the exemplary embodiment shown, an icon 512 may be provided that opens a map view of a geographic region including an area or subject matter of interest for the request for media content issued by media server 300. Additional icons 514, 516 may be provided through which a user may accept or deny, respectively, the request for media content. A user may also have the option to save (e.g., calendar) the request for media content for viewing at a later time, for example, before the expiration date associated with the request for media content.

Figure 7E:
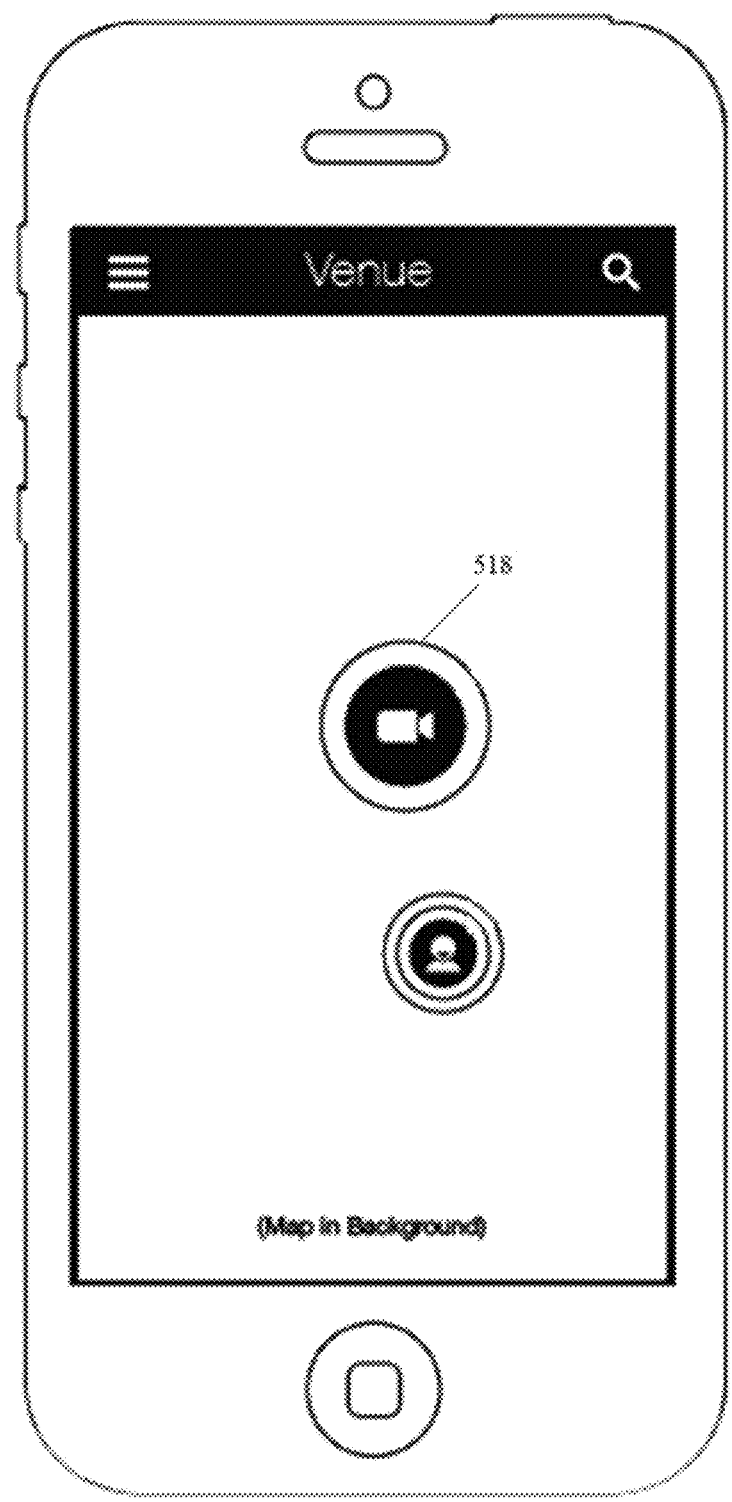
FIG. 7E is another screenshot of a graphic user interface for displaying information associated with a program product supported on a media server configured for use with the media distribution network of FIG. 1 according to an exemplary embodiment of the present invention.
Figure 7F:
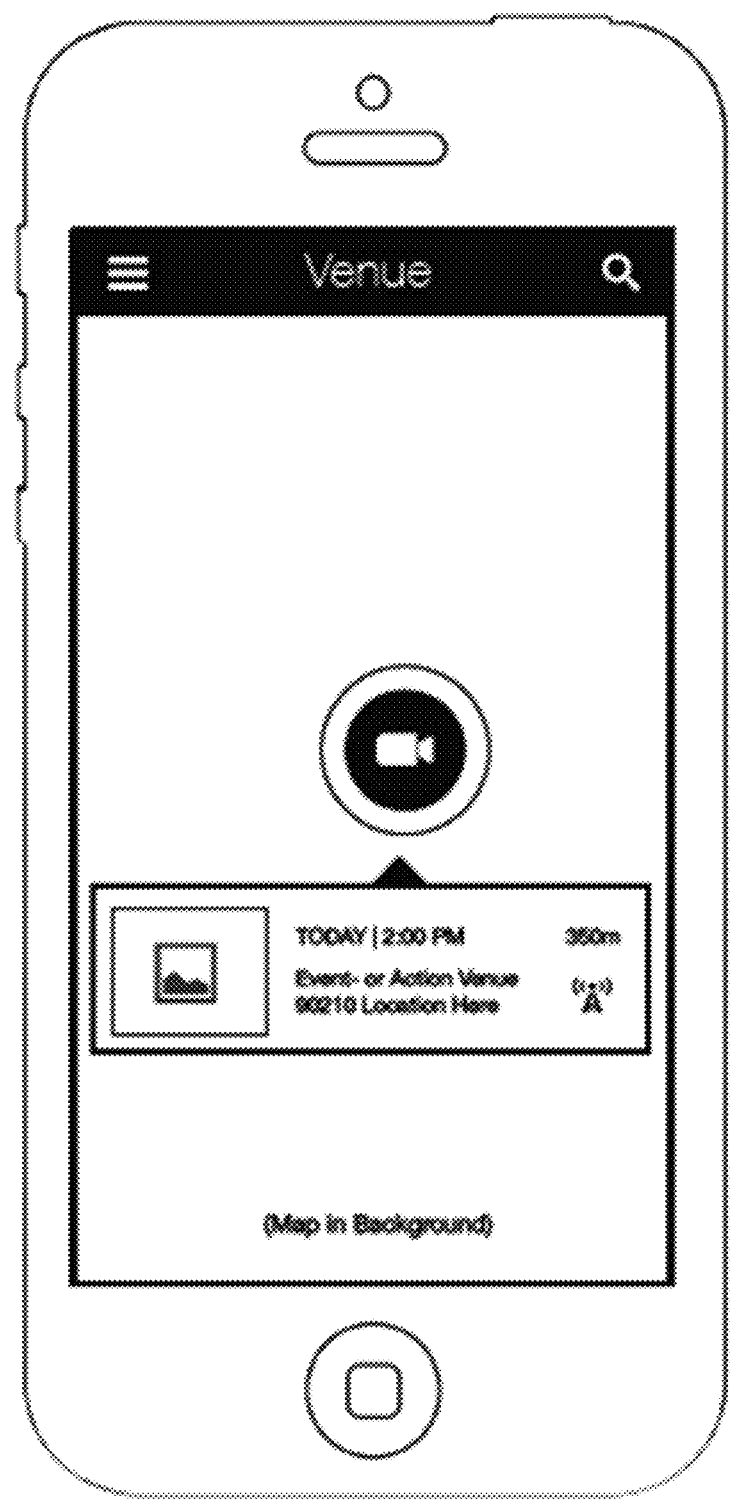
FIG. 7F is another screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7E, another exemplary embodiment of a GUI associated with a program product hosted by media server 300 is illustrated according to an exemplary embodiment of the present invention. As shown, a map view of a geographic region of interest associated with a request for media content issued by media server 300 may be provided to a user, for example, so that the user can navigate toward the relevant location to create media content. Such a location may be designated by an icon 518, as shown. Referring additionally to FIG. 7F, a user may select icon 518 to display additional information relating to the particular request for media content, for example, title, description, and/or expiration date, to name a few. Additional elements may be displayed on such a map view. For example, a concentration of requests for media content issued by media server 300 may be represented by a beacon or other indicator (for example, a color-coded section of a map reminiscent of a thermal imaging map).

Figure 7G:
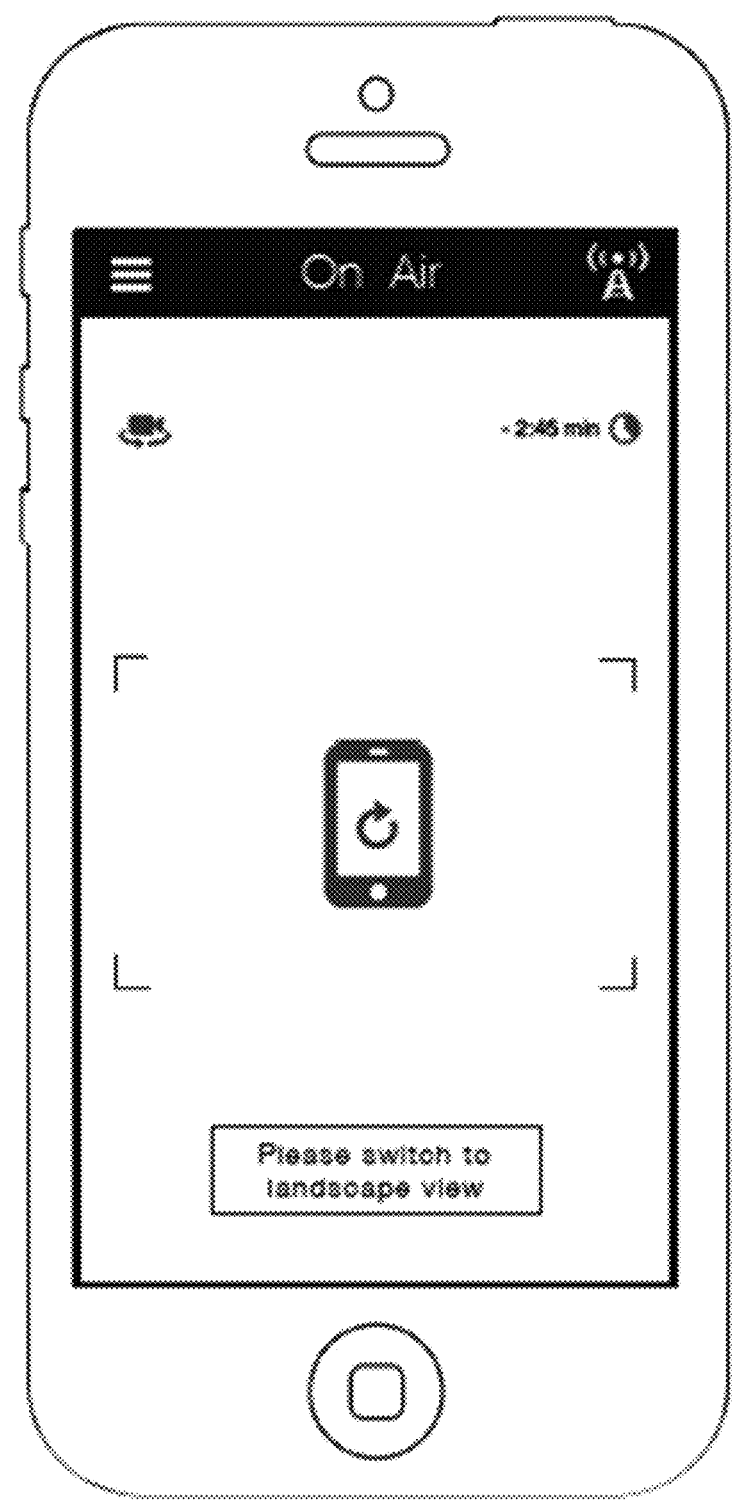
FIG. 7G is another screenshot of a graphic user interface for displaying information associated with a program product supported on a media server configured for use with the media distribution network of FIG. 1 according to an exemplary embodiment of the present invention.
Figure 7H:
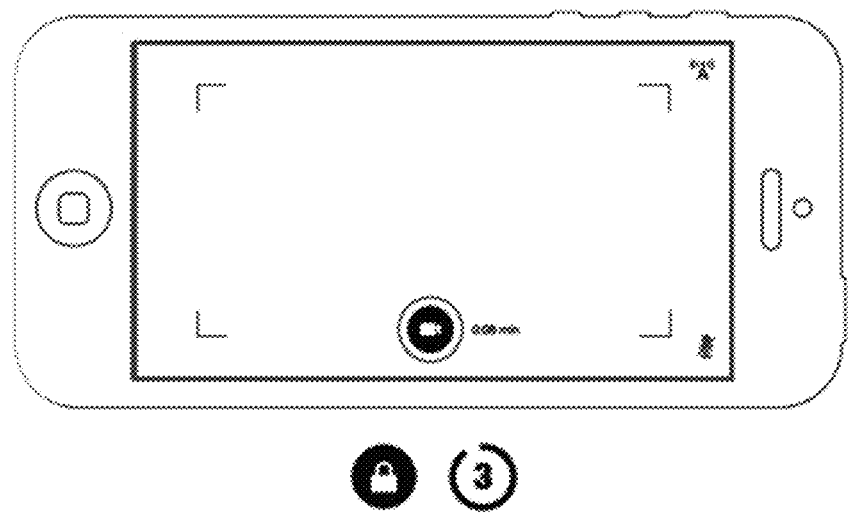
FIG. 7H is another screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7G, another exemplary embodiment of a GUI associated with a program product hosted by media server 300 is illustrated according to an exemplary embodiment of the present invention. As shown, a media capture function of a subscriber device (e.g., media capture module 106 of subscriber device 100) is shown having been activated, for example, so that a visual display of the input received through a camera device can be seen. An icon 520 may be illustrated to inform a user that an active connection to media server 300 is ongoing. Other information may be overlaid upon the viewscreen for the user's benefit, for example, an elapsed time and or instructions relating to orientation of the camera device (e.g., to switch from a portrait orientation to a landscape orientation for optimal viewing). Referring additionally to FIG. 7H, an elapsed time may be provided once a user's device is in a proper orientation to indicate that media content is being generated and/or transmitted to media server 300.

Figure 7I:
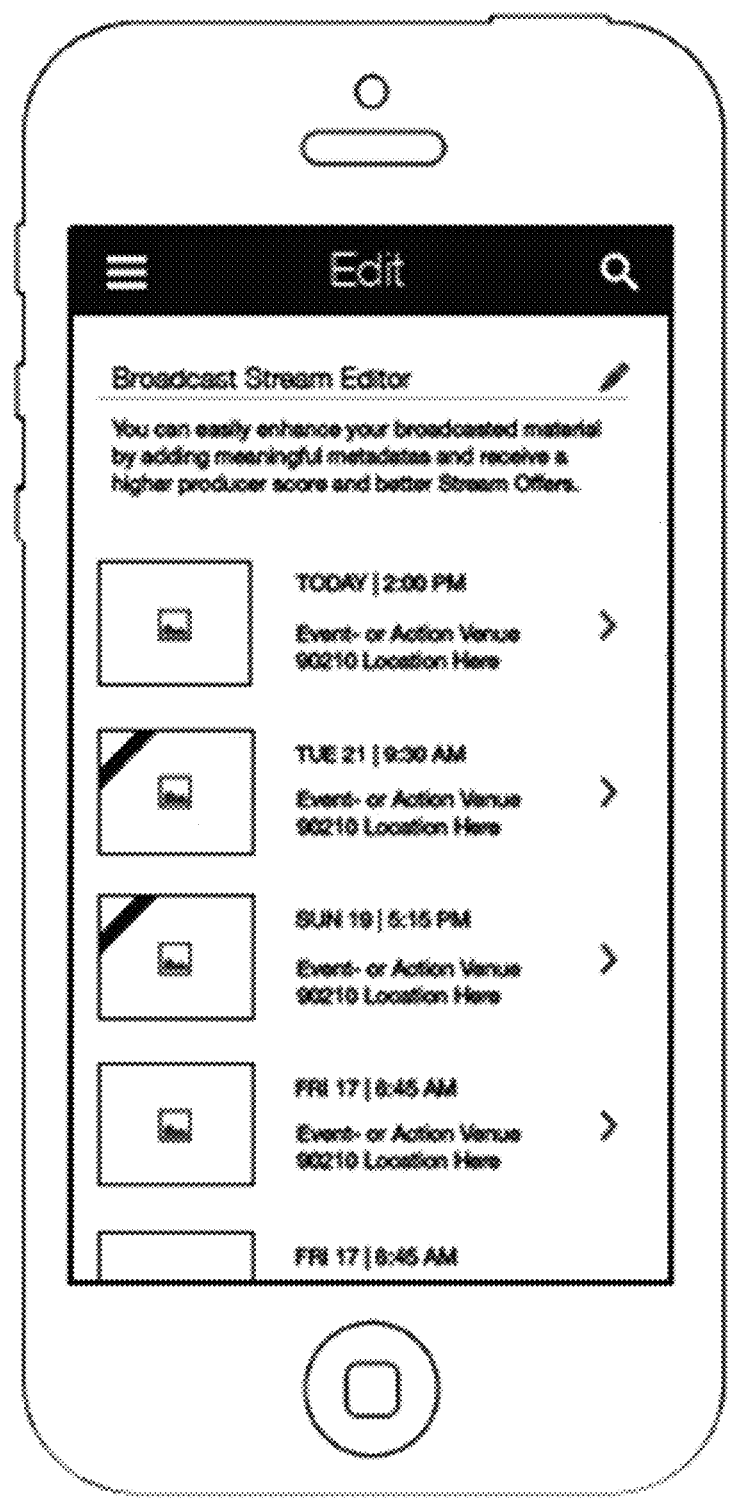
FIG. 7I is another screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7I, another exemplary embodiment of a GUI associated with a program product hosted by media server 300 is illustrated according to an exemplary embodiment of the present invention. As shown, an interface through which a user may edit, e.g., alter the content and/or accompanying data of, previously-generated media content is shown. Media content available for editing may be not-yet transmitted to media server 300, or may be currently broadcast from media server 300. Such an interface may provide instructions related to editing of media content, and may additionally display ratings and/or recognitions, for example, for media content that meets certain standards of quality.

Figure 7J:
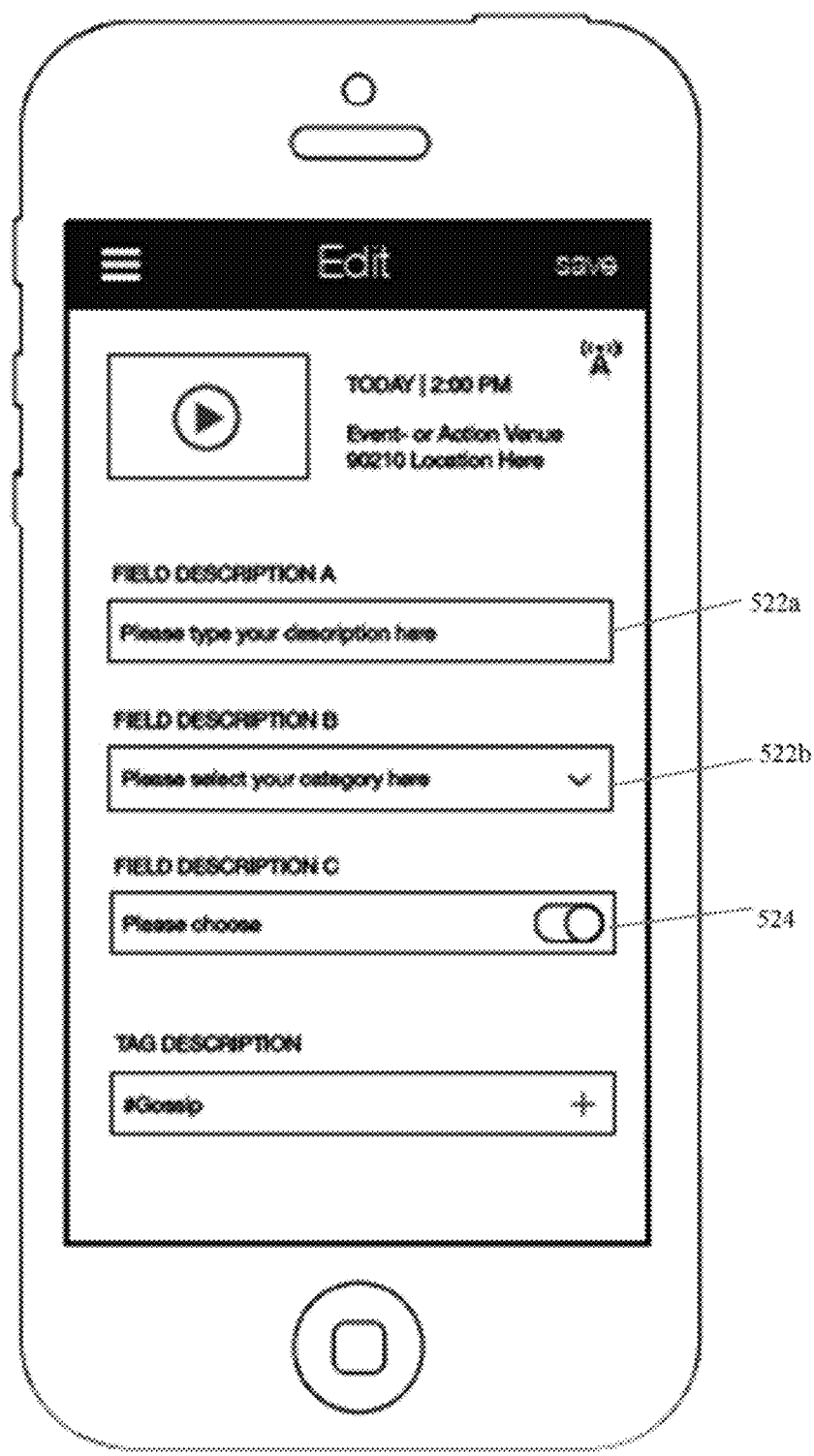
FIG. 7J is another screenshot of a graphic user interface for displaying information associated with a program product supported on a media server configured for use with the media distribution network of FIG. 1 according to an exemplary embodiment of the present invention.
Figure 7K:
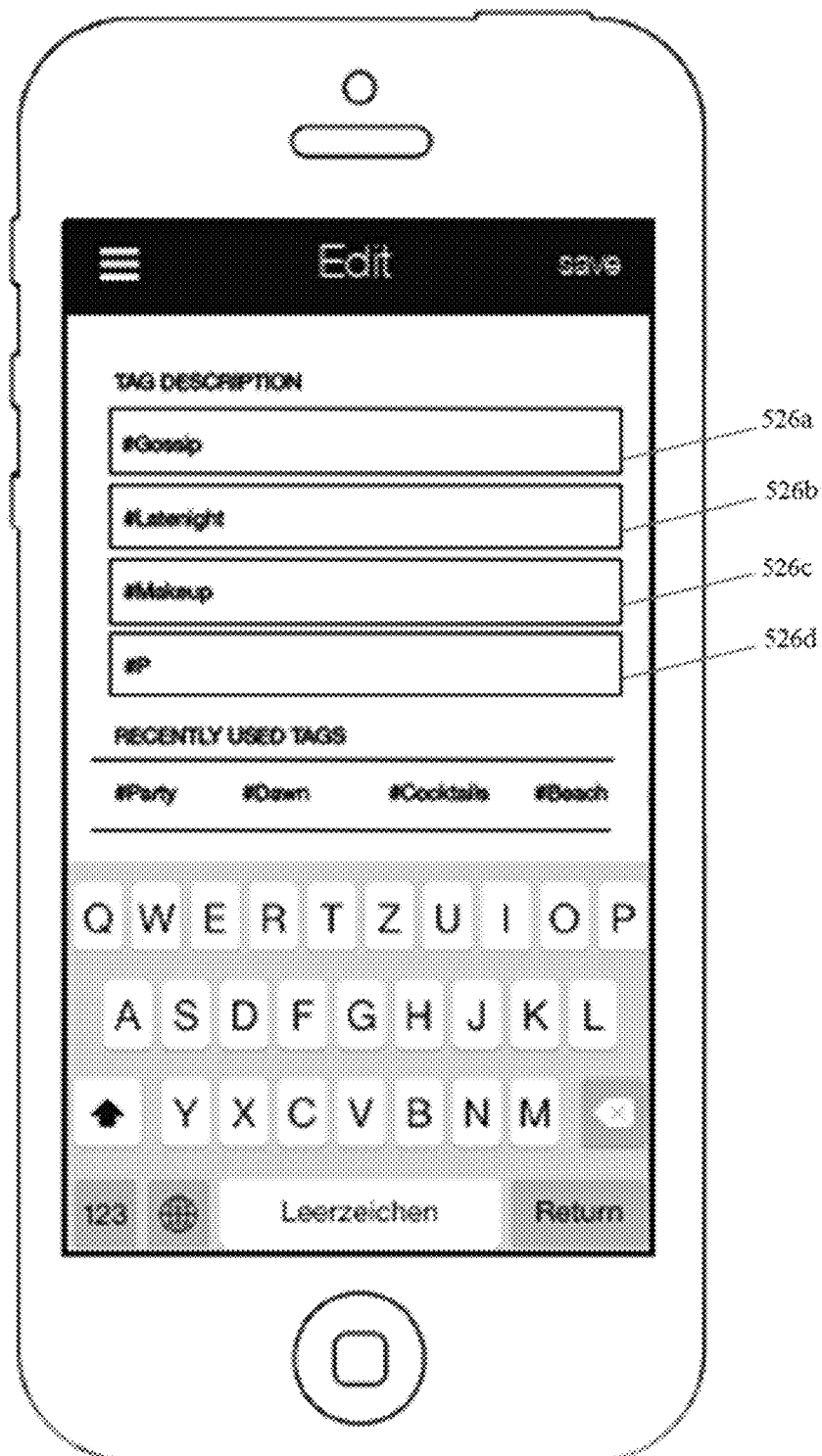
FIG. 7K is another screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7J, another exemplary embodiment of a GUI associated with a program product hosted by media server 300 is illustrated according to an exemplary embodiment of the present invention. As shown, an interface may be provided to a user through which additional data may be associated with a unit of media content, for example, metadata and/or data for display upon and/or adjacent to media content. Text entry fields 522a, 522b may be provided through which a user may enter and/or select (e.g., from a drop-down men) descriptive words and/or phrases related to the unit of media content. A description field 524 may be provided that is pre-populated with information, for example, in a drop down menu. A tag field 526 may be provided through which a user may input a descriptive tag (e.g., a hashtag) or shorthand for use in discussing the unit of media content, for example, on a social media network such as Twitter. Referring additionally to FIG. 7K, multiple text entry fields 526a, 526b, 526c, 526d may be provided for the entry of such information. In embodiments, a listing of recently word tags or phrases may be provided for a user's convenience.

Figure 7L:
FIG. 7L is another screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7L, another exemplary embodiment of a GUI associated with a program product hosted by media server 300 is illustrated according to an exemplary embodiment of the present invention. As shown, a user may be provided with compensation for successful creation of media content that is distributed across media distribution network 1000. Such compensation may be monetary in nature or may be related to privileges and functionalities of a program product associated with media server 300 (e.g., in-universe compensation). For example, a user may be provided with increased privileges or rights to generate media content with respect to certain topics.

In view of the foregoing, it will be understood that a viewer of media content ultimately distributed by media server 300 (e.g. a viewer of one or more of subscriber devices 100a, 100b, 100c . . . 100n) or through a different electronic device, may be presented with a choice among multiple units of media content.

Figure 7M:
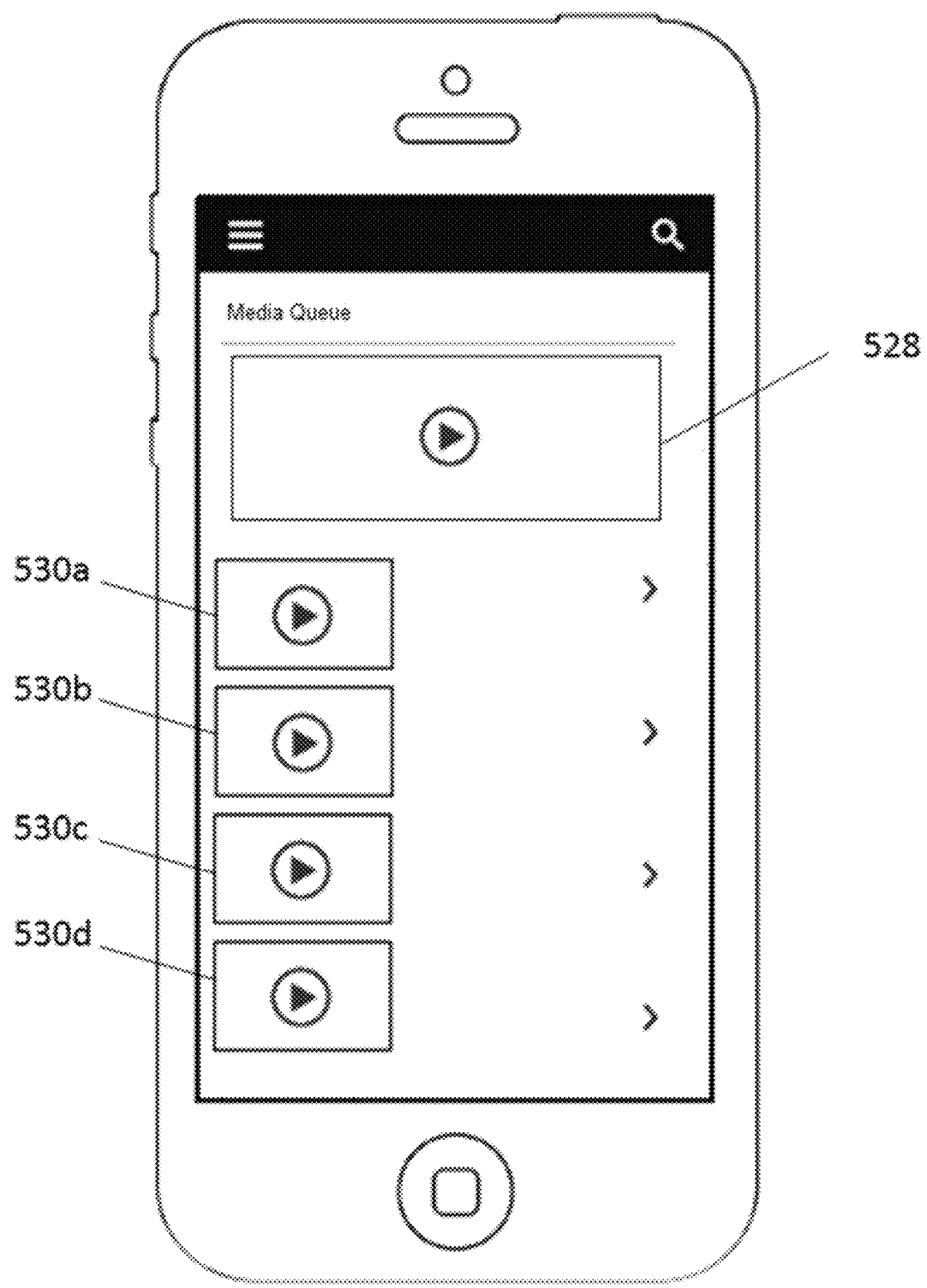
FIG. 7M is another screenshot of a graphic user interface for displaying information associated with a program product supported on a media server configured for use with the media distribution network of FIG. 1 according to an exemplary embodiment of the present invention.

Still referring to FIG. 1, FIG. 2, and FIG. 3, and referring additionally to FIG. 7M, another exemplary embodiment of a GUI associated with a program product hosted by media server 300 is illustrated. As shown, a viewer is provided with a currently displayed and/or projected unit of media content 528 (e.g., a video).

Simultaneously, the viewer is also presented with a selection among a plurality of other units of media content 530a, 530b, 530c, 530d, as shown. Such multiple units of media content may be published by publishing module 310. Such other units of media content 530a, 530b, 530c, 530d are presented in a downscaled or muted form, such as thumbnail images or previews, as shown. The other units of media content 530a, 530b, 530c, 530d can be related to the unit of media content 528 currently being displayed or projected by one or more factors, for example, content (e.g., news or other media content related to a person, place, date, or event), genre (news, politics, biography, entertainment, sports), or type (live or pre-recorded). Such relevancies of other units of media content 530a, 530b, 530c, 530d may be determined based upon associated metadata. In this regard, the viewer is presented with one or more units of media content that are supplemental in nature to the unit of media content 528 currently being displayed or projected. Selection of one or more of the other units of media content 530a, 530b, 530c, 530d pauses the unit of media content 528 that is currently being displayed and/or projected and brings the selected unit of media content into the foreground (e.g., by enlarging a thumbnail or switching the content of a video player) for display and/or projection by a user. In the course of such an action, the previously-displayed unit of media content 528 may be paused and/or recorded for later viewing by the viewer. In this regard, selection by the viewer of one or more of the other units of media content 530a, 530b, 530c, 530d allows the viewer to take a "detour" from a unit of media content 528 that is currently being displayed and/or projected to view supplemental media content. The viewer can then return to the previously-displayed unit of media content 528 without missing or having chosen to not view a portion thereof, for example, by resuming viewing of the previously-displayed unit of media content 528 or by viewing a recording of the yet-unviewed portion of the previously-displayed unit of media content 528 (in the case of live media content).

It will be understood that the above-identified interface for viewing supplemental media content may be implemented by different actions by a user, for example, pre-authorization by a user to display any and/or all supplemental media content, or manual activation by a user (e.g., during viewing of a particular unit of media content).

Further, the presentation of multiple units of media content through such an interface may provide generators of advertising content with an opportunity to appropriately scale advertising content based upon the duration of discrete units of supplemental media content. For example, a video containing commercial content having a relatively down-scaled duration (e.g., 5 to 15 seconds) may be displayed and/or projected before or after a similarly downscaled unit of media content (e.g., a video clip of relatively short duration such as less than one minute).

In an exemplary embodiment, a viewer can be viewing a unit of media content (e.g., a news broadcast) on an electronic device such as a networked television. The viewer, upon a desire to view additional information related to the content of the newscast, may prompt media server 300 (e.g., through a remote control device, voice command, or other controller), to bring up a queue of supplemental media content related to the news broadcast. The viewer is then presented with the option to immediately or following the news broadcast view the supplemental media content, which can be news articles, websites, videos, or other media content.

In embodiments, a queue of supplemental media content may be provided upon (e.g., overlaid) and/or adjacent to an already-viewable (e.g., primary) unit of media content.

In embodiments, the user may preauthorize (e.g., through a preference setting or other control) media server 300 to automatically display such supplemental media content, either as it becomes available or following the completion of a primary unit of media content.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

The invention claimed is:

1. A media server, comprising:
   one or more non-transitory computer-readable memory devices upon which at least one set of instructions are stored;
   one or more processors electronically coupled with the one or more computer-readable memory devices to implement the at least one set of instructions;
   a request computer module electronically coupled with the media server for requesting data associated with media content from one or more remote user devices electronically coupled with the media server, the request computer module configured to initiate a request for media content, the request for media content comprising a transmission of a set of data to one or more remote user devices, the set of data comprising one or more criteria for transmitting media content, the one or more criteria comprising any one or more of a topic for requested media content, a title for requested media content, a location for requested media content, a creation date for requested media content, creation timeframe for requested media content, and a device type that captured requested media content, the request computer module further configured to initiate a live electronic connection between the media server and the one or more remote user devices, the live electronic connection comprising activation of a camera or microphone on the one or more remote user devices;
   an authentication computer module electronically coupled with the one or more non-transitory computer-readable memory devices for verifying one or more permissions associated with one or more units of media content received by the media server from the one or more remote user devices;
   a filtering computer module electronically coupled with the one or more non-transitory computer-readable memory devices for detecting whether any of the one or more criteria for transmitting media content have been met with respect to data associated with the media content received from the one or more remote user devices;
   a publishing computer module for transmitting by way of an internet connection, the data associated with media content received from the one or more remote user devices when the data associated with media content received from the one or more remote use devices has met the any of the one or more criteria for transmitting media content.

2. The media server of claim 1, wherein the one or more criteria for transmitting media content comprises metadata associated with media content from the one or more remote electronic devices.

3. The media server of claim 1, wherein the filtering computer module detects one or more criteria from data attached by a tagging module of the media server to data associated with media content received from the one or more remote electronic devices.

4. The media server of claim 1, further comprising an automated tracking system for polling electronic sources to detect information upon which to base requests for media content.

5. The media server of claim 1, wherein media content is captured and transmitted to the media substantially in real time.

6. The media server of claim 1, further comprising a commercialization computer module is configured to apply data associated with a license agreement to data associated with media content received from the one or more remote electronic devices.

7. The media server of claim 1, further comprising an encoder computer module configured to format data associated with media content into a format for display on the one or more remote user devices.

8. The media server of claim 1, wherein the authentication computer module is configured to issue a cryptographic key to accompanying a request for data associated with media content from the one or more remote electronic devices.

9. The media server of claim 1, wherein the authentication computer module is configured to encrypt one or more portions of a request for data associated with media content.

10. The media server of claim 1, wherein the publishing computer module is configured to transmit data associated with multiple units of media content for display on the one or more remote electronic devices.

11. The media server of claim 10, wherein the data associated with the multiple units of media content are related by at least one of the group consisting of: content, genre, type, location, the criteria for transmitting media content, and digital signal processing data.

12. The media server of claim 10, wherein the multiple units of media content are related by associated metadata.

13. The media server of claim 1, wherein the filtering computer applies rules to select media content to transmit to the one or more remote user devices.

14. The media server of claim 13, wherein the rules comprise any of a threshold level for image quality, a presence of restricted content, and digital processing, whereby digital processing comprises any one of object recognition, facial recognition, or speech recognition.

15. The media server of claim 1, wherein the activation of a microphone or camera comprises an input prompt to initiate a live feed of digital content from the microphone or camera.

* * * * *